(12) United States Patent
Teranishi et al.

(10) Patent No.: US 10,761,640 B2
(45) Date of Patent: Sep. 1, 2020

(54) DISPLAY DEVICE

(71) Applicant: Japan Display Inc., Tokyo (JP)

(72) Inventors: Yasuyuki Teranishi, Tokyo (JP);
Takafumi Suzuki, Tokyo (JP); Michita Kudo, Tokyo (JP)

(73) Assignee: Japan Display Inc., Tokyo (JP)

( * ) Notice: Subject to any disclaimer, the term of this patent is extended or adjusted under 35 U.S.C. 154(b) by 306 days.

(21) Appl. No.: 15/872,480

(22) Filed: Jan. 16, 2018

(65) Prior Publication Data

US 2018/0217712 A1 Aug. 2, 2018

(30) Foreign Application Priority Data

Jan. 30, 2017 (JP) .................................. 2017-014527

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01); *G06F 2203/04101* (2013.01); *G06F 2203/04108* (2013.01)

(58) Field of Classification Search
None
See application file for complete search history.

(56) References Cited

U.S. PATENT DOCUMENTS

| | | | | |
|---|---|---|---|---|
| 2014/0043288 A1* | 2/2014 | Kurasawa | ............ | G06F 3/0412 345/174 |
| 2014/0111446 A1* | 4/2014 | Lee | ........ | G06F 3/0416 345/173 |
| 2014/0184534 A1* | 7/2014 | Lee | ........ | G06F 3/0412 345/173 |
| 2015/0145802 A1* | 5/2015 | Yao | ........ | G06F 3/0416 345/174 |
| 2016/0124563 A1* | 5/2016 | Wang | .................... | G06F 3/0416 345/174 |

FOREIGN PATENT DOCUMENTS

JP         2010-176297        8/2010

* cited by examiner

*Primary Examiner* — Benjamin C Lee
*Assistant Examiner* — Krishna P Neupane
(74) *Attorney, Agent, or Firm* — K&L Gates LLP

(57) ABSTRACT

According to one embodiment, a display device includes first electrodes overlapping a display area, a cover base covering the display area and a frame area, a second electrode arranged in the cover base and overlapping the frame area, a touch detection driver configured to output a drive signal to the second electrode, and a level shifter arranged between the second electrode and the touch detection driver, and configured to increase a signal level of the drive signal and output the drive signal having the increased signal level to the second electrode. The touch detection driver is configured to detect contact or proximity to an object with the frame area based on electrostatic capacitance between the first electrodes and the second electrode.

14 Claims, 14 Drawing Sheets

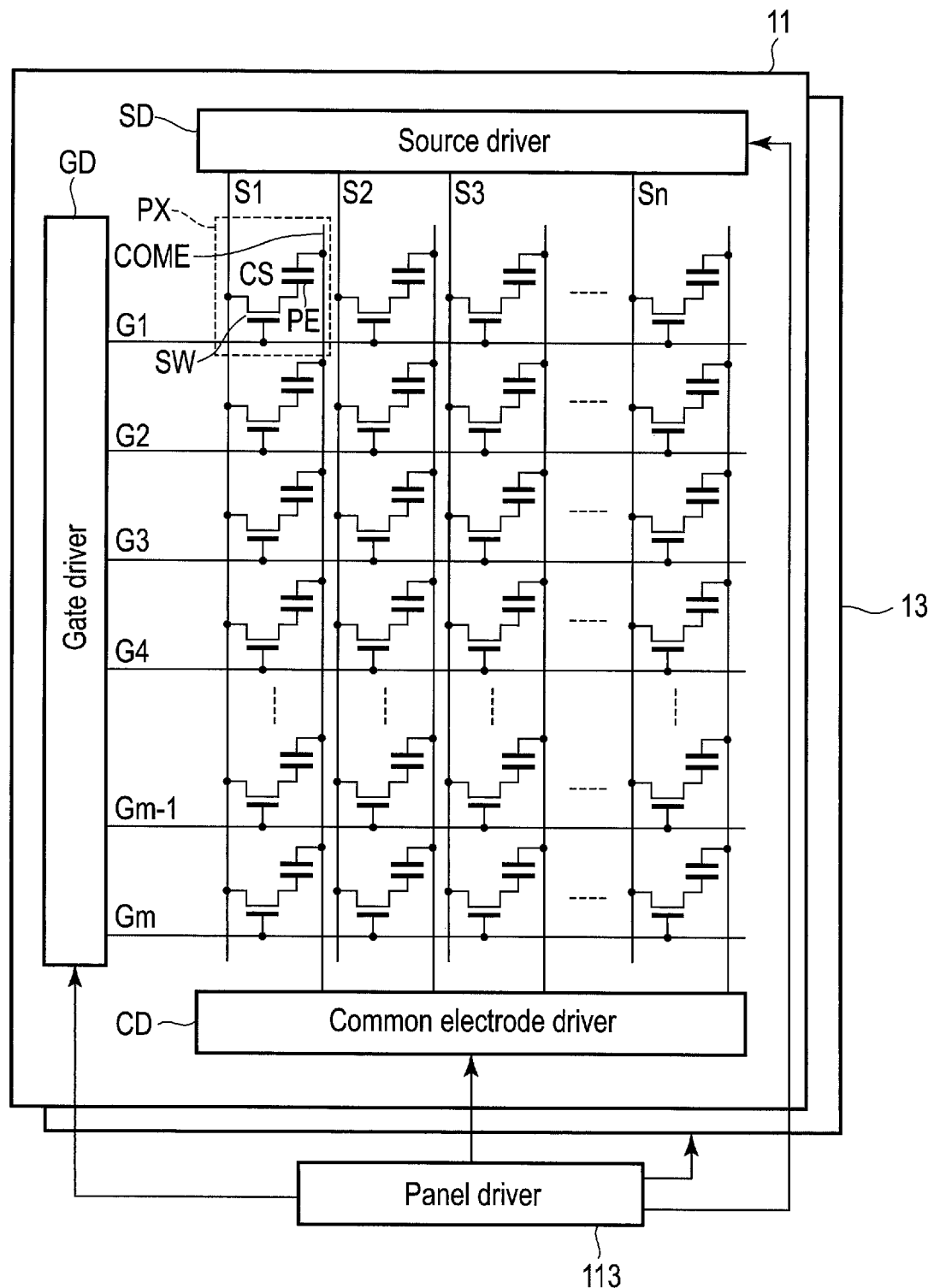
F I G. 2

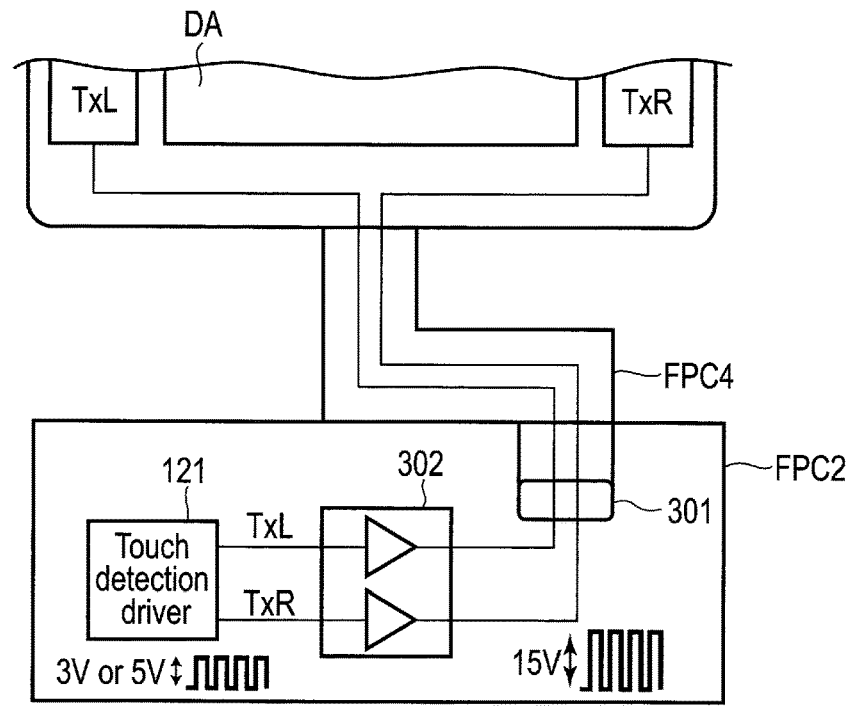
F I G. 10
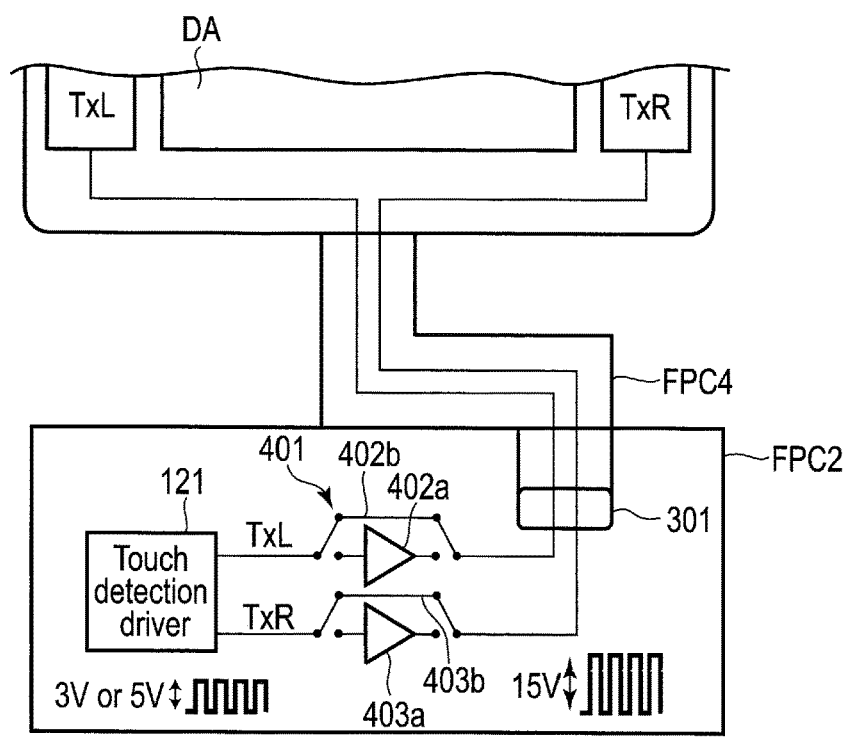
F I G. 11

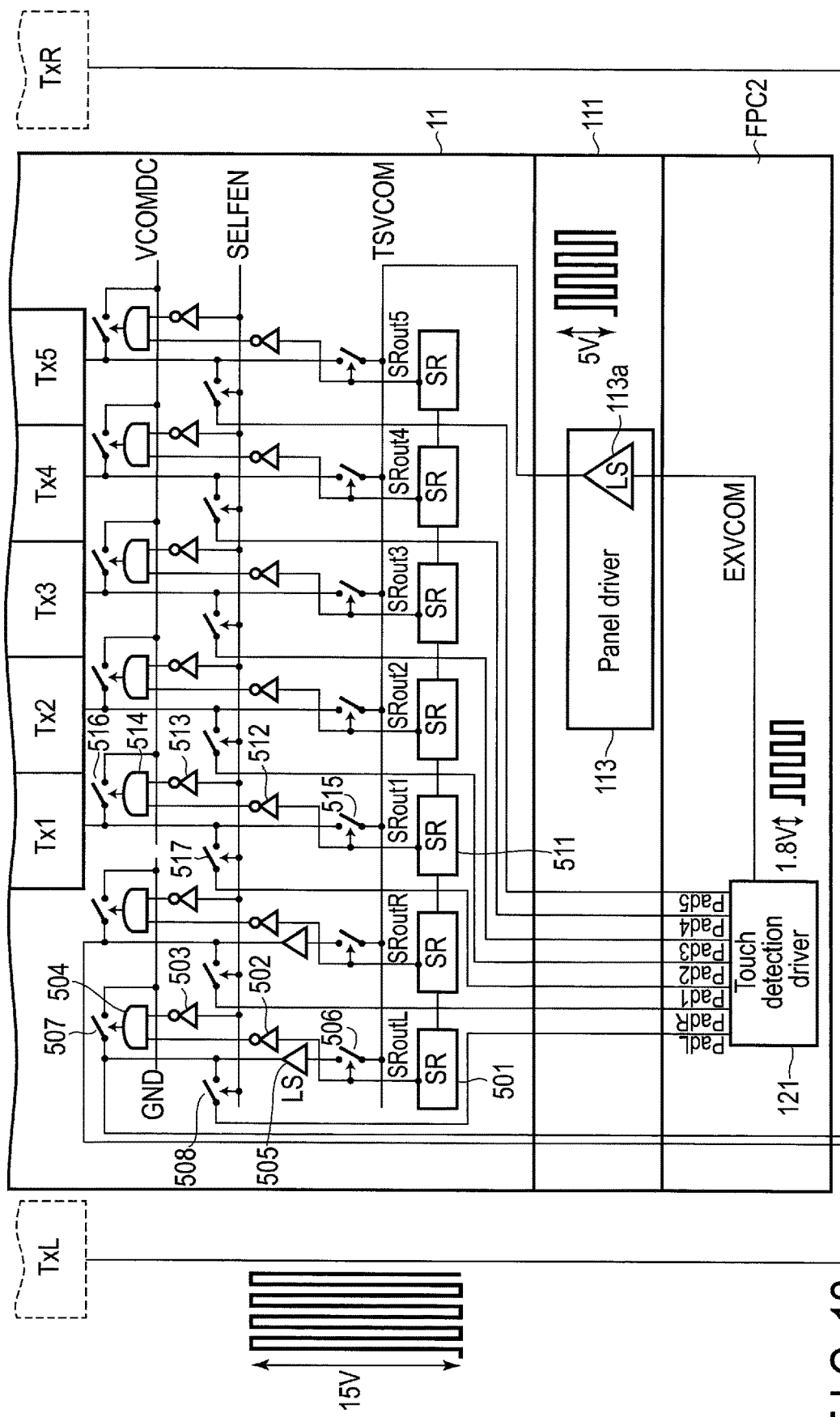
F I G. 12

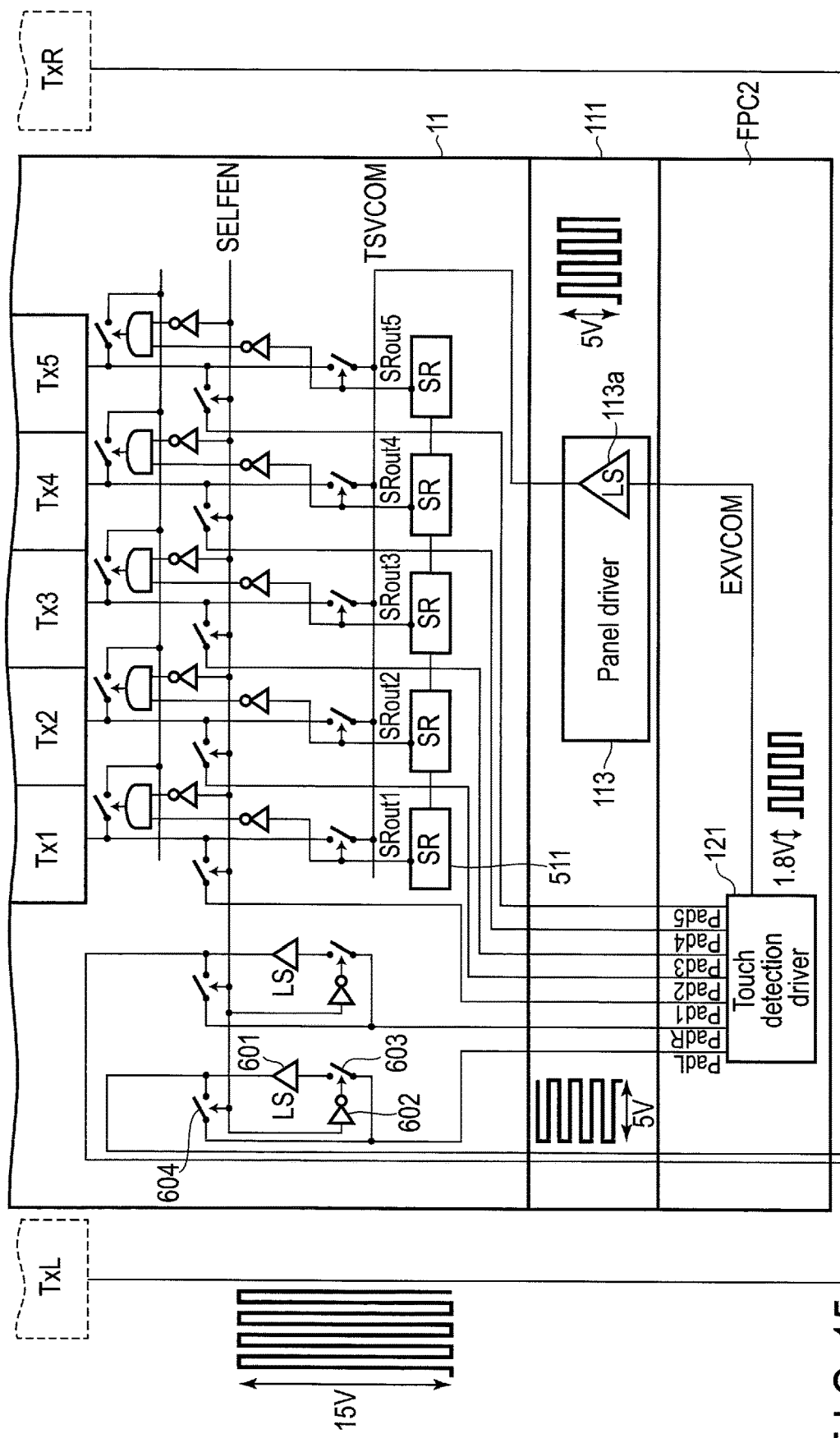
F I G. 15

DISPLAY DEVICE

CROSS-REFERENCE TO RELATED APPLICATIONS

This application is based upon and claims the benefit of priority from Japanese Patent Application No. 2017-014527, filed Jan. 30, 2017, the entire contents of which are incorporated herein by reference.

FIELD

Embodiments described herein relate generally to a display device.

BACKGROUND

Recently, electronic devices such as smartphones and tablet computers have been widespread. Such an electronic device adopts a display device having a touch detection function (hereinafter referred to as a display device with a touch detection function).

The display device with the touch detection function can detect contact or proximity, etc., of an object (external proximal object) such as a finger or a pen, for example, with a display area (active area).

In the meantime, a frame area is provided around the display area of the display device with the touch detection function.

To effectively use the frame area, it is considered helpful to realize the touch detection function in the frame area and detect contact or proximity, etc., of an object also in the frame area.

SUMMARY

The present application generally relates to a display device.

According to an embodiment, a display device includes first electrodes overlapping a display area, a cover base covering the display area and a frame area, a second electrode arranged in the cover base and overlapping the frame area, a touch detection driver configured to output a drive signal to the second electrode, and a level shifter arranged between the second electrode and the touch detection driver, and configured to increase a signal level of the drive signal and output the drive signal having the increased signal level to the second electrode. The touch detection driver is configured to detect contact or proximity to an object with the frame area based on electrostatic capacitance between the first electrodes and the second electrode.

BRIEF DESCRIPTION OF THE DRAWINGS

FIG. 2 is a diagram schematically showing the structure of a display panel.

FIG. 10 is an explanatory diagram showing the first comparative example of the present embodiment.

FIG. 11 is an explanatory diagram showing the second comparative example of the present embodiment.

FIG. 12 is an explanatory diagram showing an example of the circuit structure of the display panel.

FIG. 15 is a diagram showing an example of the circuit structure of a display panel according to the second embodiment.

DETAILED DESCRIPTION

Figure 1:
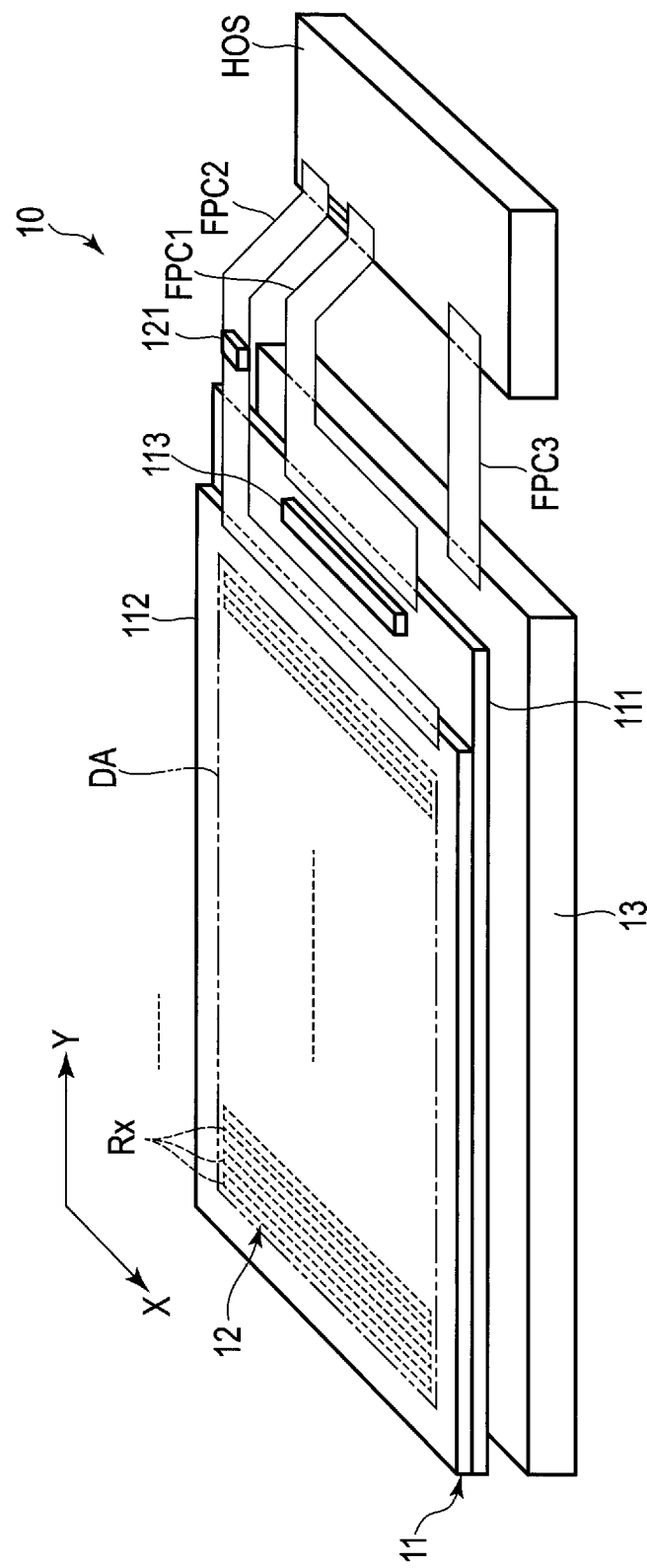
FIG. 1 is a perspective diagram schematically showing the structure of a display device according to the first embodiment.

Embodiments will be described hereinafter with reference to the accompanying drawings.

According to one embodiment, a display device which displays an image in a display area based on a pixel signal is provided. The display device includes a plurality of first electrodes overlapping the display area, a cover base covering the display area and a frame area outside the display area, a second electrode arranged in the cover base and overlapping the frame area, a touch detection driver configured to output a drive signal to the second electrode, and a level shifter arranged between the second electrode and the touch detection driver, and configured to increase a signal level of the drive signal and output the drive signal having the increased signal level to the second electrode. The touch detection driver is configured to detect contact or proximity to an object with the frame area based on electrostatic capacitance between the first electrodes and the second electrode.

The disclosure is merely an example, and proper changes in keeping with the spirit of the invention, which are easily conceivable by a person of ordinary skill in the art, come within the scope of the invention as a matter of course. In addition, in some cases, in order to make the description clearer, illustration is provided in the drawings schematically, rather than as an accurate representation of what is implemented. However, such schematic illustration is merely exemplary and in no way restricts the interpretation of the present invention. In the drawings, reference numbers of continuously arranged elements equivalent or similar to each other are omitted in some cases. In addition, in the specification and drawings, structural elements equivalent or similar to those described in connection with preceding drawings are denoted by the same reference numbers, and detailed description thereof is omitted unless necessary.

First Embodiment

FIG. 1 is a perspective diagram schematically showing the structure of a display device according to the present embodiment. The display device according to the present embodiment is a display device with a touch detection function. The display device includes a display device having a touch detection mechanism referred to as an on-cell touch detection mechanism in which a touch panel is formed on the display surface of the display device, and a display device having a touch detection mechanism referred to as an in-cell touch detection mechanism in which a common electrode for image display which is originally provided in the display device is also used as one of a pair of electrodes for touch detection and the other electrode (touch detection electrode) is arranged in such a manner as to cross the common electrode. It the following description, the display device according to the present embodiment is assumed to have the in-cell touch detection mechanism.

A display device 10 shown in FIG. 1 includes a display panel 11. The display panel 11 may be a display panel using a liquid crystal layer as a display function layer or an organic electroluminescent (EL) panel using an organic light emitting layer as a display function layer, etc., but a display panel using a liquid crystal layer will be described below.

The display panel 11 includes a first substrate 111 (array substrate), a second substrate 112 (counter-substrate) opposed to the first substrate 111, and a liquid crystal layer (not shown) formed between the first substrate 111 and the second substrate 112. A panel driver (liquid crystal driver) 113 which drives the display panel 11 is mounted on the first substrate 111, for example. The panel driver 113 can display an image in a display area DA (active area) of the display panel 11 by driving the display panel 11.

Further, the display panel 11 is integrally formed with a touch detection mechanism 12 which detects a change in capacitance, for example.

The touch detection mechanism 12 includes a plurality of touch detection electrodes Rx (first electrodes). The touch detection electrodes Rx are arranged in a location overlapping the display area DA of the display panel 11. The touch detection electrodes Rx are transparent electrodes, for example, and are formed of a transparent conductive material such as indium tin oxide (ITO). The touch detection electrodes Rx may be provided outside the display panel 11 or may be provided inside the display panel 11. The touch detection mechanism 12 is connected to a touch detection driver 121 via a flexible printed circuit board FPC2.

Although not shown in FIG. 1, in the display panel 11, the above-described common electrodes (third electrodes) for image display are provided on the first substrate 111. In the present embodiment, the common electrodes are used as one of the pair of electrodes for touch detection, and are arranged in a location opposed to the touch detection electrodes Rx. The common electrodes are formed of ITO, for example.

The display device 10 according to the present embodiment can detect contact or proximity of an object (object to be detected) with the display area DA based on electrostatic capacitance (mutual electrostatic capacitance) between the touch detection electrodes Rx and the common electrodes. Although the display device 10 can detect contact or proximity of an object, the following description will be based on the assumption that the display device 10 simply detects contact of an object for the sake of convenience.

Further, a host device HOS is provided outside the display panel 11, for example, and the host device HOS is connected to the display panel 11 via a flexible printed circuit board FPC1 and the panel driver 113. Still further, the host device HOS is connected to the touch detection mechanism 12 via the flexible printed circuit board FPC2 and the touch detection driver 121.

The panel driver 113 and the touch detection driver 121 may also be formed as a single chip. If the touch detection driver 121 and the panel driver 113 are formed as a single chip, the chip may be arranged on the second substrate 112, the flexible printed circuit board FPC1 or the flexible printed circuit board FPC2, for example, and the flexible printed circuit board FPC1 or the flexible printed circuit board FPC2, etc., may be omitted.

A backlight unit 13 is arranged on the lower side of the first substrate 111 (that is, the back surface side of the display panel 11) as an illumination device which illuminates the display panel 11. A flexible printed circuit board FPC3 connects the backlight unit 13 and the host device HOS. Any one of various backlight units may be available as the backlight unit 13, and the light source may be a light source using a light-emitting diode (LED), a light source using a cold-cathode fluorescent lamp (CCFL), etc. Here, the backlight unit 13 arranged on the back surface side of the display panel 11 is used, but a front light arranged on the display surface side of the display panel 11 may also be used. Further, an illumination device using LEDs or cold-cathode fluorescent lamps arranged on and beside a light guide may be used, or an illumination device using point light sources where light emitting elements are planarly arranged may be used. If the display device 10 is a reflective display device or the display panel 11 uses organic EL, the display device 10 may not include any illumination device.

Further, the display panel 11 of the present embodiment may be any one of a transmissive display panel, a reflective display panel and a transflective display panel. The display device 10 adopting the transmissive display panel 11 includes the backlight unit 13 on the back surface side of the first substrate 111 as described above, and has the transmissive display function of displaying an image by selectively transmitting light from the backlight unit 13. The display device 10 adopting the reflective display panel 11 includes a reflective layer which reflects light in a location closer to the back surface side of the display panel 11 than the liquid crystal layer. This display device 10 has the reflective display function of displaying an image by selectively reflecting light from the front surface side (display surface side) of the second substrate 112. Note that an auxiliary light source may be provided on the front surface side of the reflective display panel 11. Further, the reflective layer may be formed of a reflective material such as metal, and may be configured to form an electrode provided on the rear side on the display panel 11 in comparison with the liquid crystal layer. The display device 10 adopting the transflective display panel 11 has the transmissive display function and the reflective display function.

FIG. 2 schematically shows the structure of the display panel 11 provided in the display device 10. As shown in FIG. 2, the display panel 11 includes a plurality of display pixels PX (display elements) arranged in a matrix. Further, the display panel 11 includes scanning lines G (G1, G2, . . . , Gm) extending along the rows of the display pixels PX and signal lines S (S1, S2, . . . , Sn) extending along the columns of the display pixels PX, and pixel switches SW provided in the vicinity of the intersections of the scanning lines G and the signal lines S.

The pixel switch SW includes a thin-film transistor (TFT). The gate electrode of the pixel switch SW is electrically connected to the corresponding scanning line G. The source electrode of the pixel switch SW is electrically connected to the corresponding signal line S. Further, the drain electrode of the pixel switch SW is electrically connected to a corresponding pixel electrode PE. Note that the source electrode of the pixel switch SW may be connected to the corresponding pixel electrode PE and the drain electrode of the pixel switch SW may be connected to the corresponding signal line S instead.

Further, the display panel 11 includes a gate driver GD and a source driver SD which drive the display pixels PX. The scanning lines G are electrically connected to output terminals of the gate driver GD. The signal lines S are electrically connected to output terminals of the source driver SD.

The gate driver GD sequentially applies an on-state voltage to the scanning lines G and supplies the on-state voltage to the gate electrodes of the pixel switches SW which are electrically connected to the selected scanning lines G. In the pixel switch SW in which the on-state voltage is supplied to the gate electrode, the source electrode and the drain electrode are electrically connected to each other.

The source driver SD supplies output signals corresponding to the signal lines S, respectively. The signal supplied to the signal line S is supplied to the corresponding pixel electrode PE via the pixel switch SW in which the source electrode and the drain electrode are electrically connected to each other.

Further, the display panel 11 includes a common electrode driver CD. The common electrode driver CD is a circuit which supplies a drive signal (which applies a drive voltage) to common electrodes COME. The pixel electrodes PE and the common electrodes COME are opposed to each other via an insulating film. The pixel electrodes PE, the common electrodes COME and the insulating film form storage capacitance CS. The common electrodes COME are arranged such that the extension direction of the common electrodes COME crosses the extension direction of the scanning lines G.

The gate driver GD, the source driver SD and the common electrode driver CD are arranged in an area (frame) around the display panel 11 and are controlled by the panel driver 113. Further, the panel driver 113 controls the operation of the backlight unit 13.

Although only one gate driver GD is shown in FIG. 2, the display panel 11 may include a plurality of gate drivers GD. If the display panel 11 includes two gate drivers GD, for example, one gate driver GD is connected to the scanning lines G1, G3, . . . , Gm−1 among the scanning lines G, and the other gate driver GD is connected to the scanning lines G2, G4, . . . , Gm among the scanning lines G. The two gate drivers GD face each other across the display pixels PX, for example.

Figure 3:
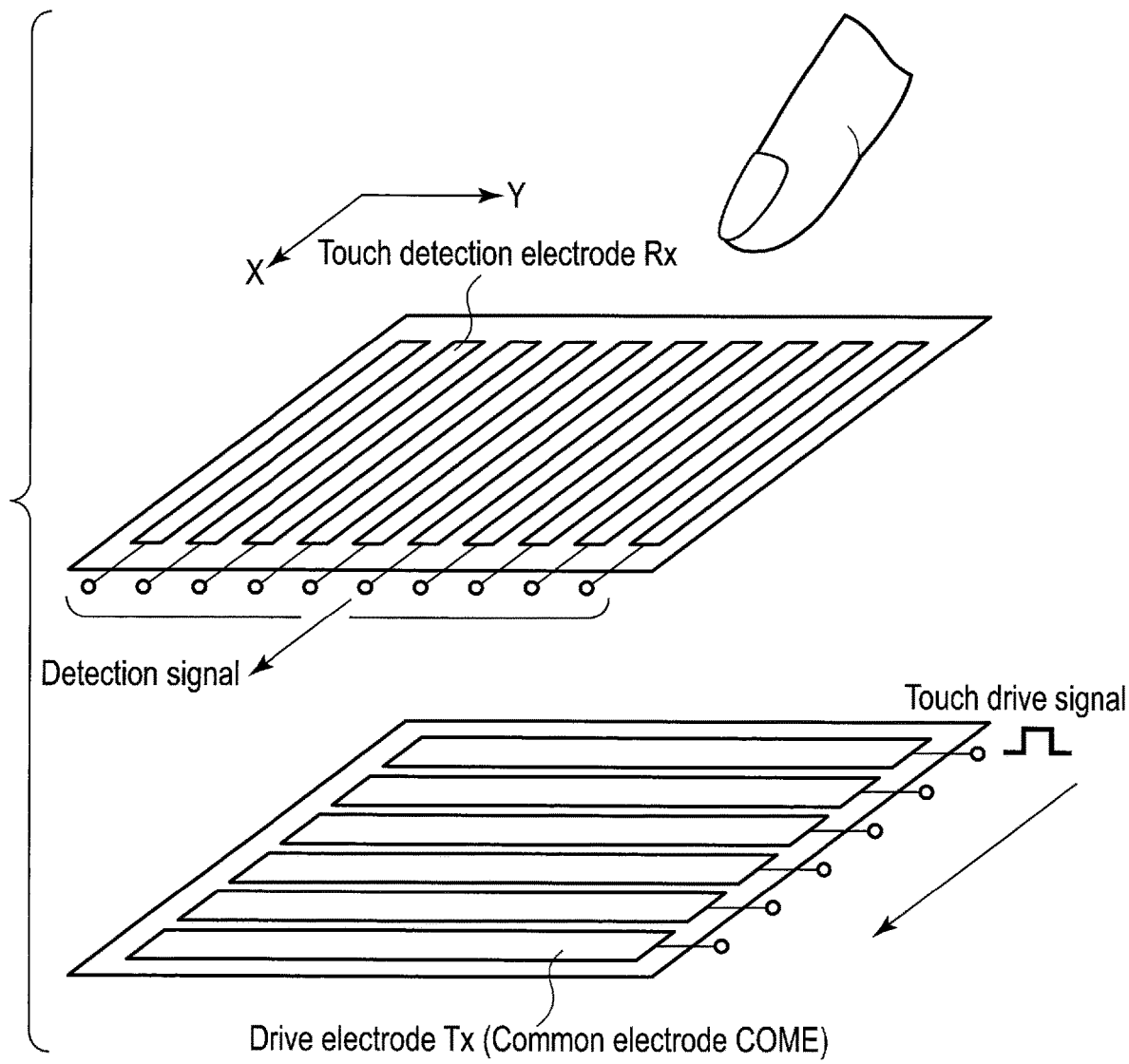
FIG. 3 is an explanatory diagram showing the basic operation of a touch detection mechanism.

FIG. 3 is an explanatory diagram showing the basic operation of the touch detection mechanism 12. Here, a touch detection operation (operation of detecting contact of an object) by a mutual capacitance detection method will be described.

In the touch detection mechanism 12 of the mutual capacitance detection method, the touch detection function is realized by the touch detection electrodes (detection elements) Rx formed in a stripe shape, for example, in an X direction (first direction) on the second substrate 112, and drive electrodes Tx formed in a stripe shape in a Y direction (second direction) on the first substrate 111. As shown in FIG. 3, the touch detection electrodes Rx and the drive electrodes Tx cross each other. The common electrodes COME for image display are used as the drive electrodes Tx.

Note that the touch detection electrodes Rx may be formed in a stripe shape in the Y direction and the drive electrodes Tx may be formed in a stripe shape in the X direction instead.

In this structure, the drive electrodes Tx are sequentially driven by a radio-frequency pulse drive signal (touch drive signal). In this case, for example, as compared to the output from the other touch detection electrodes Rx, a touch detection signal having a lower level is detected from the touch detection electrode Rx in proximity to an object such as a finger. This is because, in addition to first capacitance formed between the touch detection electrode Rx in proximity to the finger and the drive electrode Tx, second capacitance is formed between the touch detection electrode Rx and the finger. That is, the touch detection electrode Rx can output a touch detection signal based on a change in electrostatic capacitance according to a finger.

According to the touch detection mechanism 12, the coordinates of the location (contact location) of the finger can be determined from the drive timing of the drive electrode Tx and the position of the touch detection electrode Rx which outputs a low-level detection signal.

Figure 4:
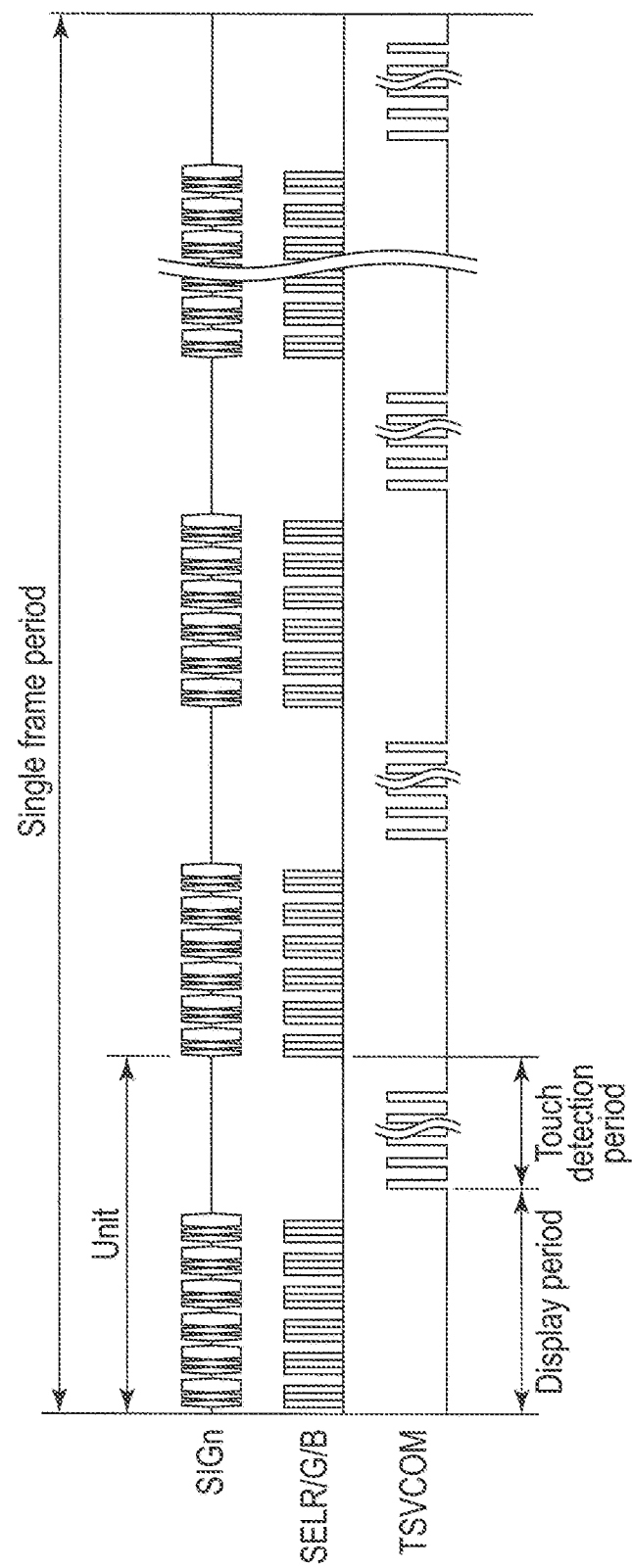
FIG. 4 is an explanatory diagram showing an example of the relationship between a display period and a touch period in the display device.

FIG. 4 shows an example of the relationship between a display period and a touch detection period in the display device 10.

In the present embodiment, the display period includes a period of executing a display operation of displaying an image in the display area DA in the display panel 11 (drive operation with respect to the display pixels PX by the gate driver GD and the source driver SD). On the other hand, the touch detection period includes a period of executing a touch detection operation of detecting contact of an object in the touch detection mechanism 12 (for example, an operation of detecting a touch detection signal by supplying a touch drive signal to the drive electrodes Tx).

Here, the stripe-shaped common electrodes COME are used as the drive electrodes Tx to which a touch drive signal is supplied in the touch detection period as described above. That is, the common electrodes COME for image display in the display area DA are also used as the drive electrodes Tx for touch detection, and therefore the display operation and the touch detection operation are executed in a time sharing manner in the present embodiment.

More specifically, as shown in FIG. 4, a period of displaying a single frame image by the above-described display operation (hereinafter referred to as a single frame period) is formed of a plurality of units. A single unit is split into the display period and the touch detection period. That is, during the period of a single unit, after an operation (display operation) of outputting a pixel signal (SIGn) per color according to a signal (SELR/G/B) which selects one of three colors R, G and B is executed with respect to a plurality of display lines (the display period), an operation of supplying a touch drive signal (drive pulse TSVCOM) to the common electrodes COME as the drive electrodes Tx is executed (the touch detection period). Since the single frame period is formed of a plurality of units as described above, the display period and the touch detection period are alternately repeated in the single frame period.

Figure 5:
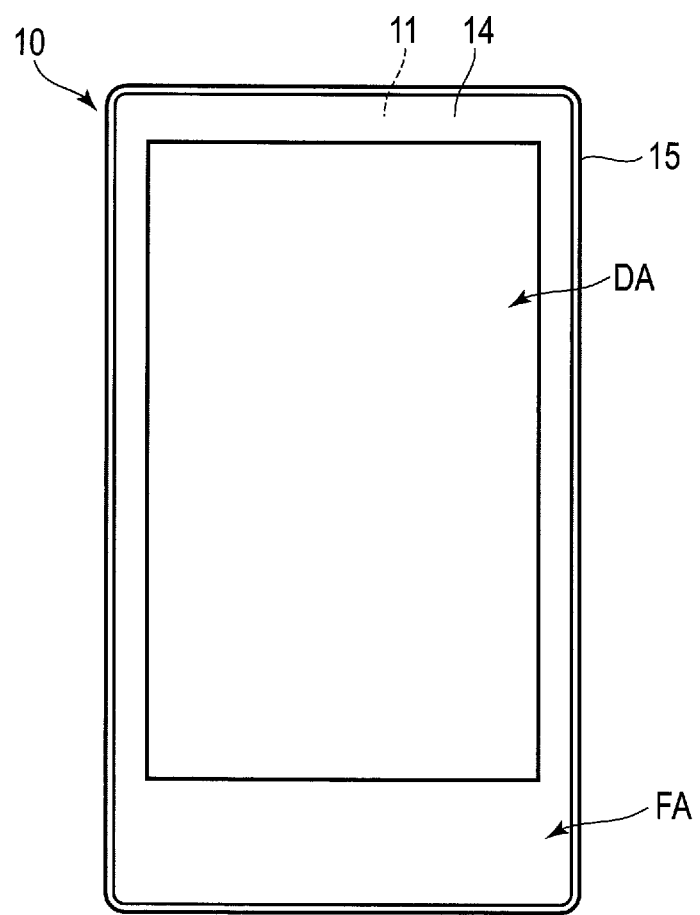
FIG. 5 is a diagram showing an example of the external appearance of the display device.

Here, the display device 10 according to the present embodiment may be realized as a smartphone (or a tablet computer) shown in FIG. 5, for example.

If the display device 10 is realized as a smartphone, etc., the display device 10 includes a cover base 14, a housing 15, etc., in addition to the display panel 11, the touch detection mechanism 12, the backlight unit 13, etc., shown in FIG. 1.

The cover base 14 covers the display area DA of the display panel 11 and a frame area FA (peripheral area) outside the display area DA. The cover base 14 is formed of transparent glass, for example, and has the function of protecting the display panel 11, etc. The cover base 14 may be formed of a transparent resin material instead.

Further, the housing 15 accommodates the display panel 11, the touch detection mechanism 12, the backlight unit 13, etc.

Meanwhile, in the display device 10 such as a smartphone, if the touch detection electrodes Rx and the drive electrodes Tx (common electrodes COME) are arranged in a location overlapping the display area DA, contact of an object cannot be detected in the frame area FA, for example.

On the other hand, if contact of an object can be detected also in the frame area FA, the user of the display device 10 can perform various operations also with respect to the frame area FA, and the convenience of the user improves.

Figure 6:
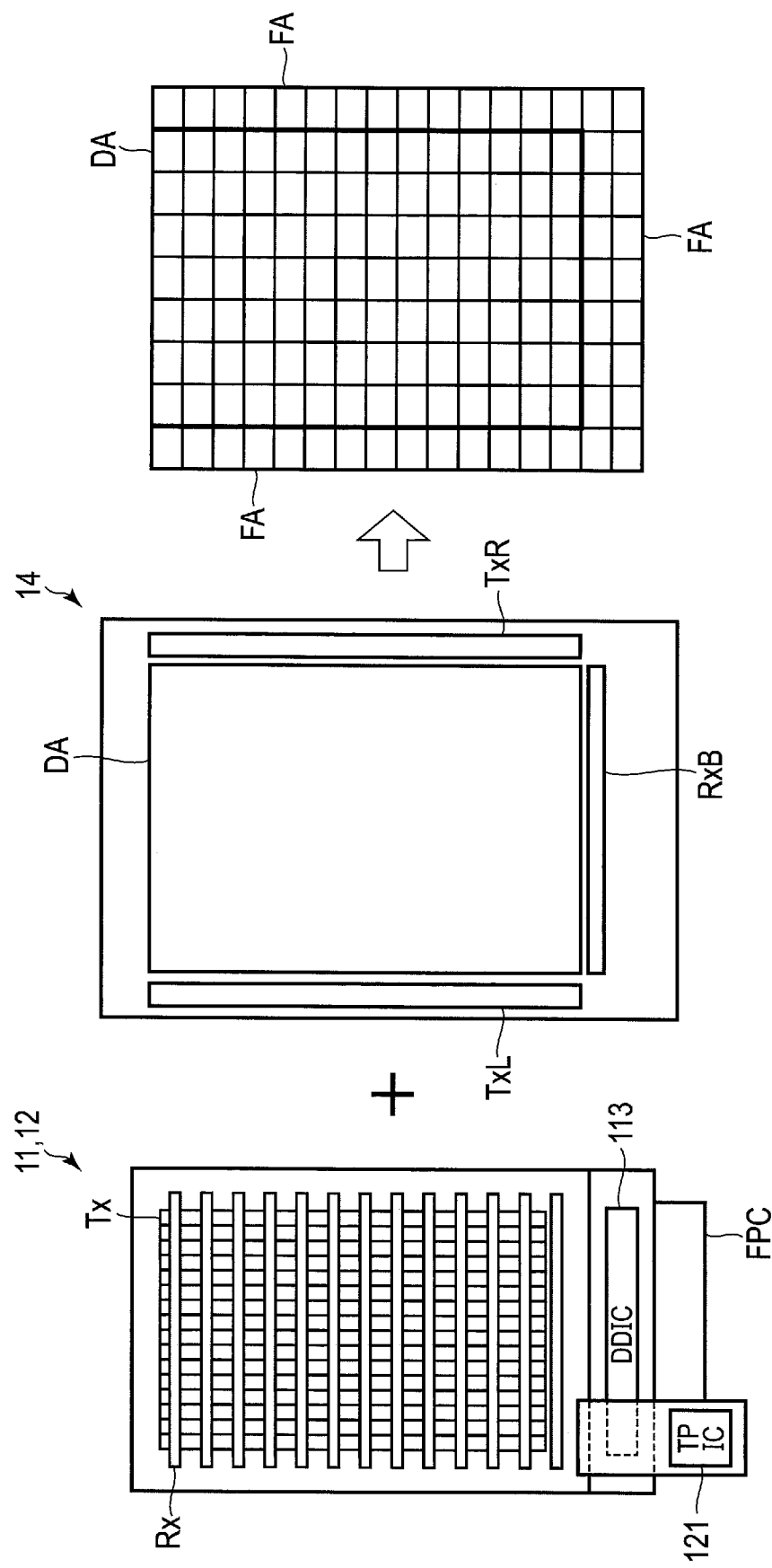
FIG. 6 is an explanatory diagram showing a drive electrode and a touch detection electrode arranged in a cover base.

Therefore, in addition to the drive electrodes Tx (common electrodes COME) and the touch detection electrodes Rx arranged in a location overlapping the display area DA, drive electrodes TxL and TxR (second electrodes) and a touch detection electrode RxB (fourth electrode) are arranged in the present embodiment as shown in FIG. 6. The drive electrodes TxL and TxR (second electrodes) and the touch detection electrode RxB (fourth electrode) are arranged in the cover base 14 and overlap the frame area FA. In the following description, the drive electrodes TxL and TxR and the touch detection electrode RxB arranged in the cover base 14 will be referred to as cover base 14 side electrodes for the sake of convenience.

According to this structure, the display device 10 of the present embodiment can detect not only contact of an object with the display area DA but also contact of an object with the frame area FA corresponding to a location in which the cover base 14 side electrodes are arranged. In the following description, an area which can detect contact of an object will be referred to as a touch detection area in the display area 10.

Figure 7:
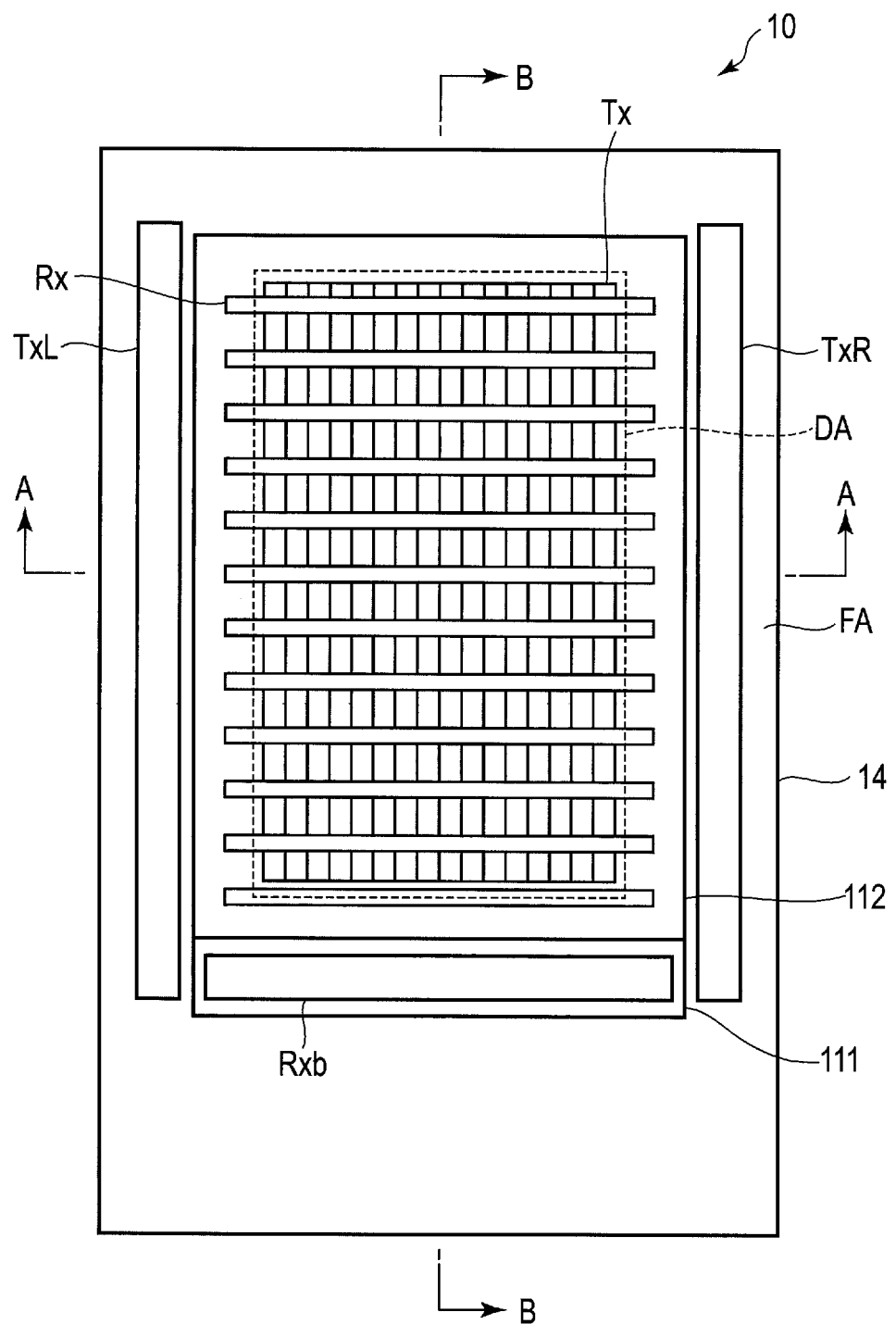
FIG. 7 is an explanatory diagram showing the positional relationship of cover base side electrodes.

The positional relationship between the drive electrodes Tx, the touch detection electrodes Rx, and the cover base side 14 electrodes (the drive electrodes TxL and TxR and the touch detection electrode RxB) will be described hereinafter with reference to FIG. 7. FIG. 7 is a plan view schematically showing the display device 10 according to the present embodiment.

As shown in FIG. 7, the first substrate 111, the second substrate 112 and the cover base 14 overlap each other in planar view in the display device 10. Further, the drive electrodes Tx provided on the first substrate 111 and the touch detection electrodes Rx provided on the second substrate 112 are arranged in a location overlapping the display area DA of the display panel 11. The display area DA has the shape of a rectangle having long sides and short sides, for example.

The drive electrodes Tx extend in a direction (second direction) along the long sides (second sides) of the display area DA and are arranged in a direction (first direction) along the short sides (first sides adjacent to the second sides) of the display area DA in a location (range) overlapping the display area DA.

The touch detection electrodes Rx extend in a direction along the short sides of the display area DA and are arranged in a direction along the long sides of the display area DA in a location (range) overlapping the display area DA.

Further, the frame area FA is provided outside (around) the display area DA as described above. In the present embodiment, the frame area FA corresponds to an area located on the inner side from the periphery of the cover base 14 and an area located on the outer side from the display area DA in planar view. The periphery of the frame area FA has a substantially rectangular shape, for example.

As shown in FIG. 7, the drive electrodes TxL and TxR are arranged in (a location overlapping) the frame area FA. The drive electrode TxL extends in a direction along the long sides of the display area DA, and is arranged between the left long side of the display area DA and the left long side of the periphery of the cover base 14. The drive electrode TxR extends in a direction along the long sides of the display area DA, and is arranged between the right long side of the display area DA and the right long side of the periphery of the cover base 14.

That is, as shown in FIG. 7, the drive electrodes TxL and TxR face each other across the display area DA in a location overlapping the frame area FA of the cover base 14. Note that the drive electrodes TxL and TxR are parallel to the drive electrodes Tx (common electrodes COME), for example.

Further, the touch detection electrode RxB is arranged in the frame area FA. The touch detection electrode RxB extends in a direction along the short sides of the display area DA, and is arranged between the lower short side of the display area DA and the lower short side of the periphery of the cover base 14. In other words, the touch detection electrode RxB is arranged along the short side of the display area DA in the location overlapping the frame area FA of the cover base 14. Note that the touch detection electrode RxB is parallel to the touch detection electrodes Rx, for example.

As described above, each of the cover base 14 side electrodes (the drive electrodes TxL and TxR and the touch detection electrode RxB) is arranged along at least one side of the display area DA. The cover base 14 side electrodes have a length greater than or substantially equal to the length of the short sides or the long sides of the display area DA, for example, but may have a length less than the length of the short sides or the long sides of the display area DA.

Further, to increase the touch detection area within the frame area FA, the cover base 14 side electrodes may be extended to the ends of the cover base 14 (frame area FA), for example.

The display device 10 according to the present embodiment can detect contact of an object with the frame area FA by using capacitance (change) between the cover base 14 side electrodes arranged in a location overlapping the frame area FA and the electrodes arranged in a location overlapping the display area DA.

In the present embodiment, since the electrode area can be secured up to the ends of the cover base 14, for example, by arranging (forming) the cover base 14 side electrodes in the cover base 14, the electrode area can be increased. As the electrode area is increased, the sensitivity of the touch detection (operation) can be improved.

Further, although omitted in FIG. 7, etc., the drive electrodes Tx (common electrodes COME) are arranged such that the extension direction of the drive electrodes Tx (common electrodes COME) crosses the extension direction of the scanning lines G as shown in FIG. 2. Therefore, wires from the drive electrodes Tx can be drawn toward the short sides of the frame area FA (the flexible printed circuit board FPC1 side). Accordingly, in contrast to a case where the common electrodes COME are arranged orthogonally to the signal lines S, it is unnecessary to provide the common electrode driver CD beside the long sides of the frame area FA. Therefore, the gap between the long sides of the display area DA and the long sides of the frame area FA (the gap along the long sides of the frame area FA) can be reduced.

Further, the cover base 14 side electrodes are separated from each other and are connected to a flexible printed circuit board (not shown) via wires, respectively, in the present embodiment. This flexible printed circuit board is connected to the flexible printed circuit board FPC2 connected to the second substrate 112, via a connector (not shown). Accordingly, the touch detection driver 121 and the cover base 14 side electrodes are connected to each other. The touch detection driver 121 can supply a touch drive signal to the drive electrodes TxL and TxR and can detect a touch detection signal based on the output of the touch detection electrode RxB.

Still further, the cover base 14 side electrodes (and the wires which connects the electrodes and the flexible printed circuit board) can be formed by means of printing using a conductive paste including a metal material such as silver (Ag) or copper (Cu).

Here, the cover base 14 side electrodes are arranged in a location overlapping the frame area FA of the cover base 14 as described above, but a colored layer is provided thoroughly in the location (range) overlapping the frame area FA of the cover base 14. Therefore, even if the cover base 14 side electrodes are formed of a highly-conductive metal material, the cover base 14 side electrodes are not likely to be seen from the outside.

Next, the touch detection operation using the cover base 14 side electrodes in the present embodiment will be described with reference to FIGS. 8 and 9.

Figure 8:
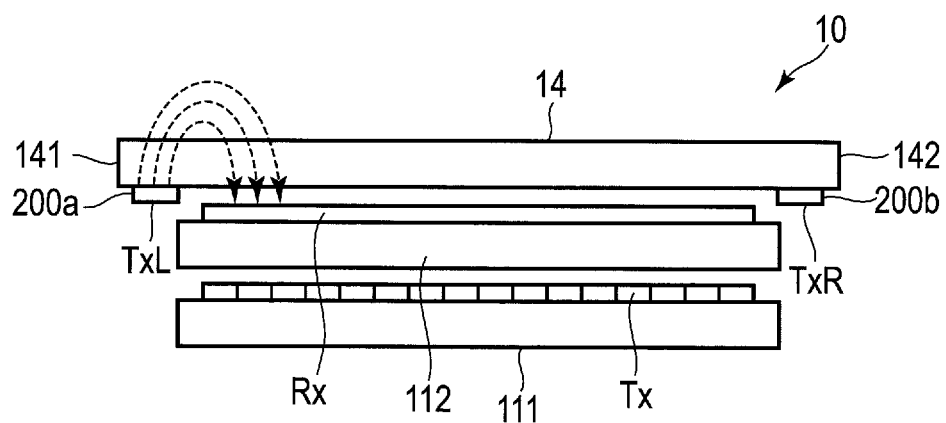
FIG. 8 is a sectional view of the display device taken along line A-A shown in FIG. 7.

FIG. 8 is a sectional view of the display device 10 taken along line A-A shown in FIG. 7. The drive electrodes Tx, TxL and TxR and the touch detection electrodes Rx and RxB are mainly illustrated and the other structure is omitted in FIG. 8. The same also applies to FIG. 9, which will be described later.

The first substrate 111 and the second substrate 112 are opposed to each other in the display device 10. The drive electrodes Tx are arranged on the first substrate 111, and the touch detection electrodes Rx are arranged on the second substrate 112.

The cover base 14 is opposed to the second substrate 112. The drive electrodes TxL and TxR are arranged in the cover base 14 as described above, but more specifically, the drive electrodes TxL and TxR are arranged in a location overlapping the frame area FA on the outer side from the ends of the touch detection electrode Rx in the extension direction, and are arranged on the second substrate 112 side surface of the cover base 14, as shown in FIG. 8.

In this case, if a touch drive signal is supplied to the drive electrode TxL, for example, electric lines of force are formed from the drive electrode TxL to the touch detection electrodes Rx (electrostatic capacitance is formed between the drive electrode TxL and the touch detection electrodes Rx).

Here, it is assumed that a finger (conductor) contacts the vicinity of the drive electrode TxL (either the vicinity of the boundary between the display area DA and the frame area FA or the frame area FA). In this case, the above-described electric line of force is cut off, the capacitance between the drive electrode TxL and the touch detection electrode Rx is changed, and consequently the potential of the output of the touch detection electrode Rx (the level of a touch detection signal) is reduced.

Therefore, in the case of using the drive electrode TxL arranged in the cover base 14 also, contact of a finger with the frame area FA can be detected similarly to the touch detection operation by the mutual capacitance detection method.

Although the description here mainly focuses on the touch detection operation using the drive electrode TxL, contact of an object can be detected also in the touch detection operation using the drive electrode TxR.

In the present embodiment, contact of a finger, etc., with the frame area FA is detected by a change in capacitance between the drive electrodes TxL and TxR arranged in (a location overlapping) the frame area FA and the touch detection electrode Rx arranged in (a location overlapping) the display area DA. Further, contact of a finger, etc., with the display area DA is detected by a change in capacitance between the drive electrodes Tx and the touch detection electrodes Rx arranged in the display area DA. Therefore, if the drive electrodes TxL and TxR and the drive electrode Tx are sequentially driven, degradation of the touch detection sensitivity near the periphery of the display area DA can be prevented.

Further, the drive electrodes TxL and TxR are arranged on the outer side from the outer edges of the second substrate 112. According to this structure, parasitic capacitance formed between wires in a location overlapping the frame area FA of the second substrate 112, and the drive electrodes TxL and TxR can be reduced, and the touch detection accuracy can be improved.

As shown in FIG. 8, an edge 200a of the drive electrode TxL and an edge 200b of the drive electrode TxR are arranged in proximity to edges 141 and 142 of the cover base 14 (or in locations overlapping the edges 141 and 142), respectively.

Figure 9:
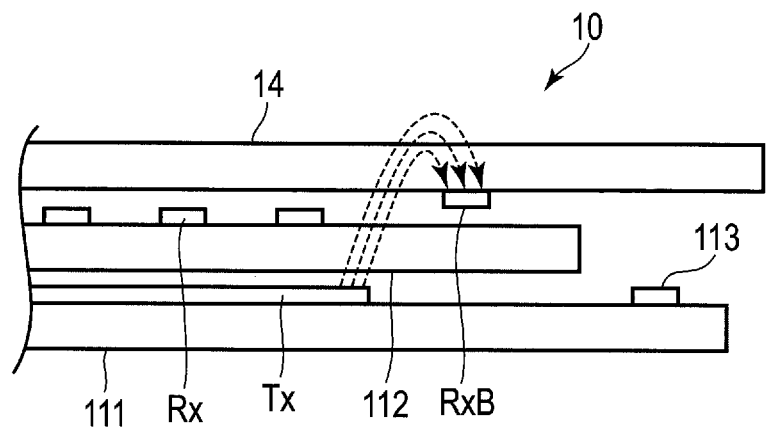
FIG. 9 is a sectional view of the display device taken along line B-B shown in FIG. 7.

FIG. 9 is a sectional view of the display device 10 taken along line B-B shown in FIG. 7. The upper part of the display device 10 shown in FIG. 7 is omitted in FIG. 9.

The touch detection electrode RxB is arranged in the cover base 14 as described above, but more specifically, the touch detection electrode RxB is arranged in a location overlapping the frame area FA located on the outer side from the ends of the drive electrodes Tx, and is arranged on the second substrate 112 side surface of the cover base 14 as shown in FIG. 9.

In this case, if a touch drive signal is supplied to the drive electrodes Tx, electric lines of force are formed from the drive electrodes Tx to the touch detection electrode RxB (electrostatic capacitance is formed between the drive electrodes Tx and the touch detection electrode RxB).

Here, it is assumed that a finger (conductor) contacts the vicinity of the touch detection electrode RxB (either the vicinity of the boundary between the display area DA and the frame area FA or the frame area FA). In this case, the above-described electric line of force is cut off, the capacitance between the drive electrode Tx and the touch detection electrode RxB is changed, and consequently the potential of the output of the touch detection electrode RxB (the level of a touch detection signal) is reduced.

Therefore, in the case of using the touch detection electrode RxB arranged in the cover base 14 also, contact of a finger with the frame area FA can be detected similarly to the touch detection operation by the mutual capacitance detection method.

According to the display device 10 of the present embodiment, not only the display area DA but also the frame area FA can function as the touch detection area as described above.

Here, to detect contact of an object with the frame area FA overlapping locations in which the drive electrodes TxL and TxR are arranged, a touch drive signal is supplied to the drive electrodes TxL and TxR. However, if the gap along the long sides of the frame area FA is wide, for example, the SN ratio may be low and the touch detection accuracy (sensitivity) in the frame area FA may be insufficient.

In such a case, the touch detection accuracy in the frame area FA can be improved by increasing the signal level of a touch drive signal (the amplitude level of a power voltage) supplied to the drive electrodes TxL and TxR, for example.

Therefore, a structure (hereinafter referred to as a first comparative example of the present embodiment) including an external level shifter IC which increases the signal level of a touch drive signal supplied to the drive electrodes TxL and TxR will be described with reference to FIG. 10.

In the first comparative example of the present embodiment, the drive electrodes TxL and TxR are connected to a flexible printed circuit board FPC4 via wires, respectively, as shown in FIG. 10.

The flexible printed circuit board FPC4 is connected to the flexible printed circuit board FPC2, which is connected to the second substrate 112, via a connector 301. Accordingly, the drive electrodes TxL and TxR are connected to the touch detection driver 121. A touch drive signal is supplied to the drive electrodes TxL and TxR by the touch detection driver 121.

Here, to increase the signal level of a touch drive signal supplied to the drive electrodes TxL and TxR as described above, a level shifter IC 302 is provided in the first comparative example of the present embodiment.

The level shifter IC 302 increases the signal level of a touch drive signal supplied from the touch detection driver 121 to the drive electrode TxL and a touch drive signal supplied from the touch detection driver 121 to the drive electrode TxR. More specifically, if the signal level of the touch drive signal (drive pulse) supplied from the touch detection driver 121 is 3 or 5 V, the level shifter IC 302 increases the signal level of the touch drive signal to 15 V, for example. That is, the output level of the touch drive signal supplied to the drive electrode TxL and TxR in the frame area FA differs from the output level of the touch drive signal supplied to the drive electrodes Tx in the display area DA, and the signal level (drive pulse) of the touch drive signal is two to five times higher than that of the signal output to the drive electrodes Tx in the display area DA.

Accordingly, the touch drive signal having the increased signal level is supplied to the drive electrodes TxL and TxR, and consequently the touch detection accuracy in the frame area FA can be improved.

However, in the case of providing the external level shifter IC 302 in the flexible printed circuit board FPC2 as in the first comparative example of the present embodiment shown in FIG. 10, the cost of the level shifter IC 302 needs to be considered.

Here, the touch detection operation may be executed by a detection method other than the mutual capacitance detection method such as a self capacitance detection method in the touch detection mechanism 12. Note that the mutual capacitance detection method is a method of detecting contact of an object based on electrostatic capacitance (mutual electromagnetic capacitance) between the drive electrode and the touch detection electrode as described above. On the other hand, the self capacitance detection method is a method of detecting contact of an object based on a change in electrostatic capacitance (self electromagnetic capacitance) of a single electrode (for example, a drive electrode) in accordance with proximity or non-proximity of an object with respect to the electrode.

That is, in the self capacitance detection method, for example, it is necessary to receive, from a drive electrode, a signal (touch detection signal) corresponding a drive signal supplied from the touch detection driver 121 to the drive electrode; however, the level shifter IC 302 can only pass current in the direction of supplying current to the drive electrodes TxL and TxR. Consequently, the touch detection operation by the self capacitance detection method cannot be executed in the first comparative example of the present embodiment.

Therefore, a structure (hereinafter referred to as a second comparative example of the present embodiment) including an external system 401 conforming to the self capacitance detection method in place of the level shifter IC 302 of the first comparative example as shown in FIG. 11 is assumed.

According to the external system 401, the signal level of the touch drive signal supplied to the drive electrode TxL can be increased by a level shifter 402a, and the touch detection signal can be received from the drive electrode TxL via a pathway 402b. Similarly, the signal level of the touch drive signal supplied to the drive electrode TxR can be increased by a level shifter 403a, and the touch detection signal can be received from the drive electrode TxR via a pathway 403b.

That is, according to the second comparative example of the present embodiment, the touch detection accuracy in the frame area FA can be improved, and the touch detection operation can be executed by the self capacitance detection method.

However, the external system 401 of the second comparative example of the present embodiment cannot be easily provided, and as compared to the first comparative example, the cost will be increased even more.

Therefore, the present embodiment adopts a structure conforming to both the mutual capacitance detection method and the self capacitance detection method and including a level shifter formed of a TFT in the panel. Further, a level shifter function is provided also in the panel driver 113 in the present embodiment.

An example of the circuit structure (panel circuit) of the display panel 11 will be described hereinafter with reference to FIG. 12. In FIG. 12, a structure for supplying a touch detection signal to each drive electrode in the execution of a touch detection operation (that is, during a touch detection period) will be mainly described. That is, the gate driver GD, the source driver SD, etc., which execute a drive operation with respect to the display pixels PX (that is, a display operation) are omitted in FIG. 12.

Here, drive electrodes Tx1 to Tx5 are provided as the drive electrodes Tx in the display panel 11 show in FIG. 12. Further, the drive electrodes TxL and TxR shown in FIG. 12 are arranged (formed) in the cover base 14. In the execution of the touch detection operation, a touch drive signal is supplied to these drive electrodes. Further, the panel driver 113 is provided on the first substrate 111 and includes a level shifter 113a which realizes the above-described level shifter function.

The display panel 11 includes a shift register circuit, an inverter (NOT gate), an AND circuit, a level shifter, etc. The shift register circuit, the inverter and the AND circuit are provided for each of the drive electrodes TxL, TxR and Tx1 to Tx5. Further, the level shifter is provided for each of the drive electrodes TxL and TxR.

Firstly, a shift register circuit 501, an inverter 502, an inverter 503, an AND circuit 504 and a level shifter 505 provided for the drive electrode TxL will be described.

As control signals related to the touch detection operation, for example, a touch detection start pulse and a touch detection clock are input to the shift register circuit 501. According to the touch detection start pulse and the touch detection clock, the shift register circuits provided respectively for the drive electrodes TxL, TxR and Tx1 to Tx5 are sequentially selected. If the shift register circuit 501 is selected, the shift register circuit 501 outputs "1".

The inverter 502 is connected to the shift register circuit 501. The inverter 502 outputs "0" if the output from the shift register circuit 501 is "1", and the inverter 502 outputs "1" if the output from the shift register circuit 501 is "0".

A detection method designation signal SELFEN is input to the inverter 503. The detection method designation signal SELFEN is "1 (High)" if the touch detection operation by the self capacitance detection method is executed, and the detection method designation signal SELFEN is "0 (Low)" if the touch detection operation by the mutual capacitance detection method is executed. If the detection method designation signal SELFEN is "1" (that is, the touch detection operation by the self capacitance detection method is executed), the inverter 503 outputs "0". Further, if the detection method designation signal SELFEN is "0" (that is, the touch detection operation by the mutual capacitance detection method is executed), the inverter 503 outputs "1".

One input terminal of the AND circuit 504 is connected to the output terminal of the inverter 502. The other input terminal of the AND circuit 504 is connected to the output terminal of the inverter 503. The AND circuit 504 outputs "1" if "1" is input to both of the input terminals, and the AND circuit 504 outputs "0" if "0" is input to at least one of the input terminals.

Here, the touch detection driver 121 outputs a pulse signal having a voltage which periodically changes in the touch detection period, namely, a drive signal EXVCOM as the touch detection signal. The panel driver 113 supplies a drive pulse TSVCOM, which is obtained through level shifting and impedance conversion of the drive signal EXVCOM, to the drive electrodes (drive electrodes TxL, TxR and Tx1 to Tx5). If the drive signal EXVCOM has a signal level of about 1.8 V, for example, the level shifter 113a in the panel driver 113 outputs the drive pulse TSVCOM having an increased signal level of about 5 V, for example.

The level shifter 505 is arranged between the drive electrode TxL and the touch detection driver 121 (panel driver 113). The drive pulse TSVCOM output from the pulse driver 113 (level shifter 113a) is input to the level shifter 505 via a switch 506. The level shifter 505 increases the signal level of the input drive pulse TSVCOM, and outputs the input drive pulse TSVCOM having the increased signal level to the drive electrode TxL. In this case, the drive pulse TSVCOM having a signal level of 15 V, for example, is output. The switch 506 is in a connected state (on state) if the output of the shift register circuit 501 is "1", and the switch 506 is in a disconnected state (off state) if the output of the shift register circuit 501 is "0".

Further, a ground voltage (GND) is supplied to the drive electrode TxL via a switch 507. The switch 507 is in the connected state if the output of the AND circuit 504 is "1", and the switch 507 is in the disconnected state if the output of the AND circuit 504 is "0". According to the switch 507, if the touch detection operation by the mutual capacitance detection method is executed (that is, the detection method designation signal SELFEN is "0") and the shift register circuit 501 is not selected (that is, the output of the shift register circuit 501 is "0"), the ground voltage is supplied to the drive electrode TxL.

Further, (a plurality of switches including) a switch 508 is provided as a switch which switches between the mutual capacitance detection method and the self capacitance detection method in the present embodiment. The switch 508 is in the connected state if the detection method designation signal SELFEN is "1", and the switch 508 is in the disconnected state if the detection method designation signal SELFEN is "0". Accordingly, if the switch 508 is in the connected state (that is, the detection method designation signal SELFEN is "1"), a touch drive signal (drive pulse) for the self capacitance detection method output from the touch detection driver 121 is supplied to the drive electrode TxL. If the switch 508 is in the disconnected state (that is, the detection method designation signal SELFEN is "0"), the drive pulse TSCVOM (that is, a touch drive signal for the mutual capacitance detection method) or the ground voltage is supplied to the drive electrode TxL.

In FIG. 12, the touch drive signal for the self capacitance detection method supplied to the drive electrodes TxL, TxR and Tx1 to Tx5 is represented as PadL, PadR and Pad1 to Pad5, respectively.

Although the description here focuses on the drive electrode TxL, the same also applies to the drive electrode TxR, and therefore detailed description thereof is omitted.

Further, a shift register 511, an inverter 512, an inverter 513 and an AND circuit 514 similar to the shift register circuit 501, the inverter 502, the inverter 503 and the AND circuit 504 are provided for the drive electrode Tx1.

Here, the ground voltage is supplied to the drive electrode TxL via the switch 507, but a direct-current voltage VCOMDC is supplied to the drive electrode Tx1 via a switch 516 which is switched between the connected state and the disconnected state according to the output of the AND circuit 514. The direct-current voltage (signal) VCOMDC corresponds to the drive signal for the display operation.

According to the switch 516, if the touch detection operation by the mutual capacitance detection method is executed (that is, the detection method designation signal SELFEN is "0") and the shift register circuit 511 is not selected (that is, the output of the shift register circuit 511 is "0"), the direct-current voltage VCOMDC is supplied to the drive electrode Tx1.

Note that switches 515 and 517 provided for the drive electrode Tx1 are the same as the switches 506 and 508, and therefore detailed description thereof is omitted.

Although the description here focuses on the drive electrode Tx1, the same also applies to the other drive electrodes Tx2 to Tx5. The shift register circuits, the inverters and the AND circuits provided for the drive electrodes Tx1 to Tx5 constitute the common electrode driver CD provided in the display panel 11.

Further, unlike the drive electrodes TxL and TxR, level shifters are not provided in the drive electrodes Tx1 to Tx5. Therefore, the drive pulse TSVCOM having a signal level increased by the level shifter is supplied to the drive electrode TxL and TxR, but the drive pulse TSVCOM output from the panel driver 113 (level shifter 113a) is directly supplied to the drive electrodes Tx1 to Tx5.

Next, the touch detection operation in the display device 10 of the present embodiment will be described with reference to the timing chart shown in FIG. 13.

Here, after the touch detection operation by the mutual capacitance detection method is executed, the touch detection operation by the self capacitance detection method is executed (that is, the mutual capacitance detection method is switched to the self capacitance detection method). In FIG. 13, touch detection periods T1 to T7 correspond to a period of executing the touch detection operation by the mutual capacitance detection method, and touch detection periods T8 and T9 correspond to a period of executing the touch detection operation by the self capacitance detection method.

In the execution of the touch detection operation by the mutual capacitance detection method, the touch drive signal for the mutual capacitance detection method is sequentially supplied to the drive electrodes TxL, TxR and Tx1 to Tx5.

Firstly, the touch detection period T1 in which the touch drive signal is supplied to the drive electrode TxL will be described.

The shift register circuit 501 provided for the drive electrode TxL is selected in the touch detection period T1. In this case, the shift register circuit 501 outputs "1".

Here, the touch detection driver 121 outputs the drive signal EXVCOM having a signal level of 1.8 V, for example, as the touch drive signal as described above. The drive signal EXVCOM is subjected to level shifting and impedance conversion by the panel driver 113 (level shifter 113a). Accordingly, the panel driver 113 outputs the drive pulse TSVCOM having a signal level of 5 V.

If the output (SRoutL) of the shift register circuit 501 is "1", the switch 506 is in the connected state as described above. Accordingly, the drive pulse TSVCOM is input to the level shifter 505 via the switch 506.

The level shifter 505 increases the signal level of the input drive pulse TSVCOM. In this case, the drive pulse TSVCOM having a signal level of 15 V, for example, is supplied to the drive electrode TxL.

Accordingly, the touch detection driver 121 can detect contact of an object with the frame area FA in which the drive electrode TxL is arranged, based on mutual electrostatic capacitance between the drive electrode TxL and the touch detection electrodes Rx.

If the shift register circuit 501 is selected, the output of the other shift register circuits (the shift register circuits provided for the drive electrodes TxR and Tx1 to Tx5) is "0". In this case, the switches (such as the switch 515, etc.) provided between the touch detection driver 121 (panel driver 133) and the drive electrodes TxR and Tx1 to Tx5 are in the disconnected state. Therefore, the drive pulse TSVCOM is not supplied to the drive electrodes TxR and Tx1 to Tx5.

Figure 13:
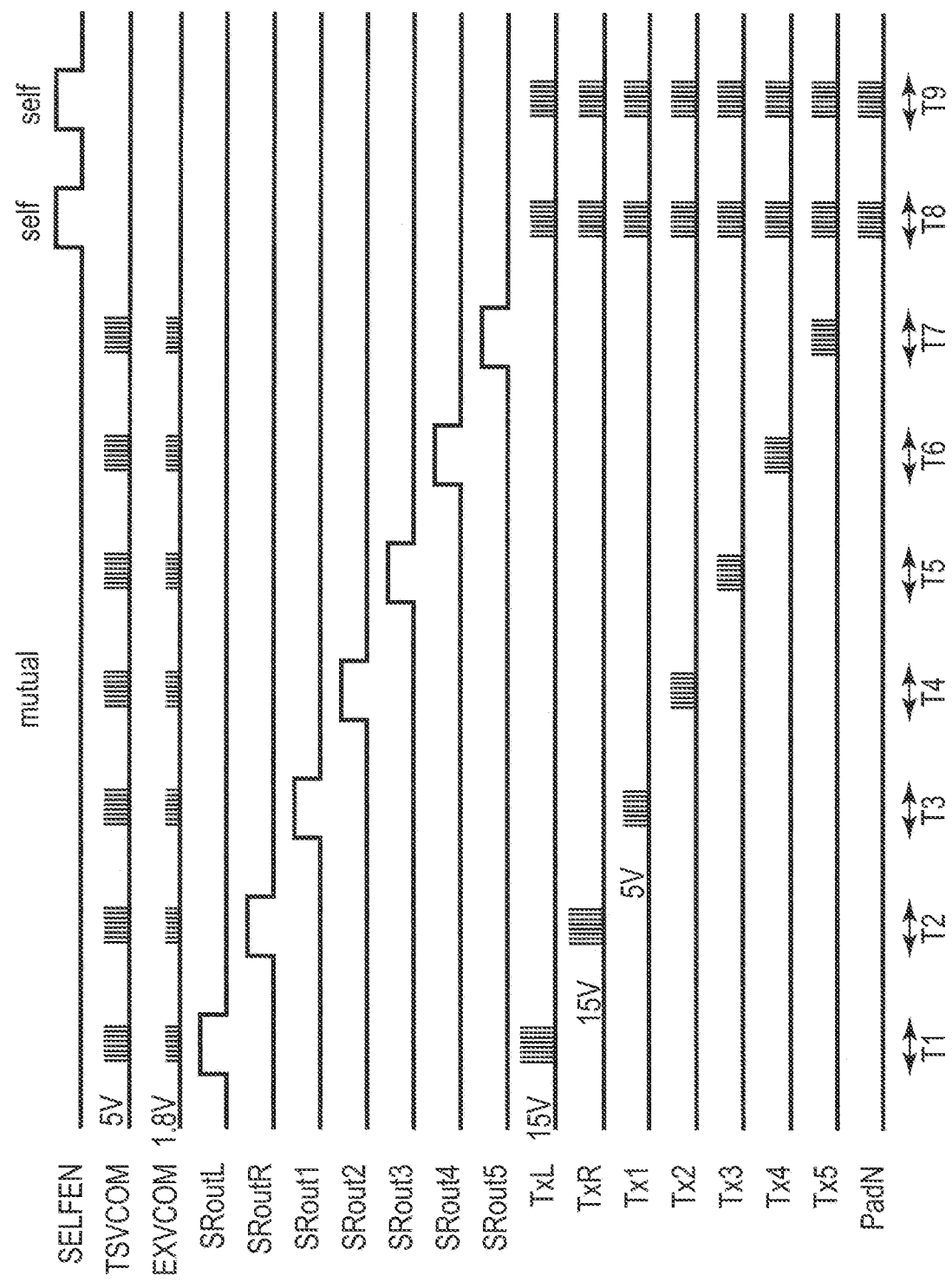
FIG. 13 is a timing chart showing a touch detection operation.

Further, as shown in FIG. 13, if the touch detection operation by the mutual capacitance detection method is executed (that is, the detection method designation signal SELFEN is "0"), a touch drive signal PadN for the self capacitance detection method is not output from the touch detection driver 121. The touch drive signal PadN shown in FIG. 13 represents the touch drive signals PadL, PadR and Pad1 to Pad5 for the self capacitance detection method which are supplied to the drive electrodes TxL, TxR and Tx1 to Tx5.

In the touch detection period T1, since the output of the shift register circuit 501 is "1", the output of the inverter 502 is "0". Further, since the detection method designation signal SELFEN is "0", the output of the inverter 503 is "1". In this case, "0" is input to one input terminal of the AND circuit 504 and "1" is input to the other input terminal of the AND circuit 504, and thus the output of the AND circuit 504 is "0". Accordingly, the switch 507 is in the disconnected state.

On the other hand, since the output of the shift register circuit provided for the drive electrode TxR is "0", the output of the inverter connected to the shift register circuit is "1". Further, since the detection method designation signal SELFEN is "0", the output of the inverter to which the detection method designation signal SELFEN is input is "1". In this case, "1" is input to both terminals of the AND circuit provided for the drive electrode TxR, and thus the output of the AND circuit is "1". Accordingly, the switch is set to the connected state in accordance with the output of the AND circuit, and the ground voltage is supplied to the drive electrode TxR via the switch.

Further, since the output of the shift register 511 provided for the drive electrode Tx1 is "0", the output of the inverter 512 is "1". Still further, since the detection method designation signal SELFEN is "0", the output of the inverter 513 is "1". In this case, "1" is input to both terminals of the AND circuit 514 provided for the drive electrode Tx1, and thus the output of the AND circuit 514 is "1". Accordingly, the switch 516 is set to the connected state in accordance with the output of the AND circuit 514, and the direct-current voltage VCOMDC is supplied to the drive electrode Tx1 via the switch 516. Although the description here focuses on the drive electrode Tx1, the direct-current voltage VCOMDC is also supplied to the other drive electrodes Tx2 to Tx5.

That is, the drive pulse TSVCOM (15 V) is supplied only to the drive electrode TxL in the touch detection period T1 shown in FIG. 13. Although not shown in FIG. 13, the ground voltage is supplied to the drive electrode TxR, and the direct-current voltage VCOMDC is supplied to the drive electrodes Tx1 to Tx5.

Although the description here focuses on the touch detection period T1, the drive pulse TSVCOM (15 V) is supplied to the drive electrode TxR in the touch detection period T2, similarly to the drive electrode TxL in the touch detection period T1. In this case, the ground voltage is supplied to the drive electrode TxL, similarly to the drive electrode TxR in the touch detection period T1. Further, the direct-current voltage VCOMDC is supplied to the drive electrodes Tx1 to Tx5 similarly to the touch detection period T1.

Next, the touch detection period T3 in which the touch drive signal is supplied to the drive electrode Tx1 will be described. The shift register circuit 511 provided for the drive electrode Tx1 is selected in the touch detection period T3. In this case, the shift register circuit 511 outputs "1".

If the output (SRoutL) of the shift register circuit 511 is "1", the switch 515 is in the connected state as described above. Accordingly, the drive pulse TSVCOM is supplied to the drive electrode Tx1. Since the level shifter is not provided for the drive electrode Tx1, the signal level of the drive pulse TSVCOM supplied to the drive electrode Tx1 is 5 V, for example.

Accordingly, the touch detection driver 121 can detect contact of an object with the display area DA in which the drive electrode Tx1 is arranged, based on mutual electrostatic capacitance between the drive electrode Tx1 and the touch detection electrode Rx.

If the shift register circuit 511 is selected, the output of the other shift register circuits is "0", and thus the drive pulse TSVCOM is not supplied to the shift register circuits provided for the drive electrodes TxL, TxR and Tx2 to Tx5. In this case, although detailed description is omitted, the ground voltage is supplied to the drive electrodes TxL and TxR, and the direct-current voltage VCOMDC is supplied to the drive electrodes Tx2 to Tx5.

Similarly, the drive pulse TSVCOM (5 V) is supplied to the drive electrode Tx2 in the touch detection period T4. Further, the drive pulse TSVCOM (5 V) is supplied to the drive electrode Tx3 in the touch detection period T5. Still further, the drive pulse TSVCOM (5 V) is supplied to the drive electrode Tx4 in the touch detection period T6. Still further, the drive pulse TSVCOM (5 V) is supplied to the drive electrode Tx5 in the touch detection operation T7.

In the execution of the touch detection operation by the mutual capacitance detection method, the drive pulse TSVCOM is sequentially supplied to the drive electrodes TxL, TxR and Tx1 to Tx5 as described above.

Here, the description has been based on the assumption that the drive pulse TSVCOM is supplied in the order of the drive electrodes TxL, TxR, Tx1, Tx2, Tx3, Tx4 and Tx5, but the order of drive electrodes to which the drive pulse TSVCOM is supplied can be appropriately changed. For example, the drive pulse TSVCOM may be supplied in the order of arrangement of drive electrodes, that is, in the order of the drive electrodes TxL, Tx1, Tx2, Tx3, Tx4, Tx5 and TxR, for example.

Here, it is assumed that the mutual capacitance detection method is switched to the self capacitance detection method. In the execution of the touch detection operation by the self capacitance detection method, the touch drive signal PadN for the self capacitance detection method is supplied to the drive electrodes TxL, TxR and Tx1 to Tx5, respectively.

The touch detection driver 121 outputs (supplies) the touch drive signal PadN (PadL, PadR and Pad1 to Pad5) for the self capacitance detection method in the touch detection period T8 in which the touch detection operation by the self capacitance detection method is executed.

In the execution of the touch detection operation by the self capacitance detection method, the detection method designation signal SELFEN is "1". In this case, for example, since the switch 508 provided for the drive electrode TxL is in the connected state, the touch drive signal PadL output from the touch detection driver 121 is supplied to the drive electrode TxL. Since the same switches provided for the drive electrodes TxR and Tx1 to Tx5 are also in the connected state, the touch drive signals PadR and Pad1 to Pad5 are also supplied to the drive electrodes TxR and Tx1 to Tx5.

Accordingly, the touch detection driver 121 can detect contact of an object based on the self capacitance of the drive electrodes TxL and TxR and Tx1 to Tx5.

As shown in FIG. 13, if the touch detection operation by the self capacitance detection method is executed (that is, the detection method designation signal SELFEN is "1"), the touch drive signal for the mutual capacitance detection method (the drive signal EXVCOM and the drive pulse TSVCOM) is not output.

Further, for example, since the output of the shift register circuit 501 provided for the drive electrode TxL is "0", the output of the inverter 502 is "1". In the execution of the touch detection operation by the self capacitance detection method, the detection method designation signal SELFEN is "1", and thus the output of the inverter 503 is "0". In this case, since the output of the AND circuit 504 is "0", the switch 507 is in the disconnected state. Although the description here focuses on the switch 507 provided for the drive electrode TxL, the same switches provided for the other drive electrodes TxR and Tx1 to Tx5 are also in the disconnected state.

In the execution of the touch detection operation by the self capacitance detection method, the touch drive signal PadN for the self capacitance detection method is supplied to the drive electrodes TxL, TxR and Tx1 to Tx5 as described above.

Although the description here focuses on the touch detection period T8, the same operation as that of the touch detection period T8 will be executed when the touch detection operation by the self capacitance detection method is executed in the touch detection period T9, for example.

As described above, in the present embodiment, the drive electrodes TxL and TxR (second electrodes) are arranged in such a manner as to overlap the frame area FA in the cover base 14, and the touch drive signal output from the touch detection driver 121 is increased in signal level and output to the drive electrodes TxL and TxR, and based on electrostatic capacitance between the touch detection electrodes Rx (first electrodes) and the drive electrodes TxL and TxR, contact or proximity of an object (for example, a finger, etc.) with the frame area FA is detected.

More specifically, after the drive signal EXVCOM, which is output from the touch detection driver 121 as the touch drive signal, is increased in signal level in (the level shifter 113a inside) the panel driver 113, the drive pulse TSVCOM is supplied to the drive electrodes Tx, and the drive pulse TSVCOM is further increased in signal level and supplied to the drive electrodes TxL and TxR.

According to this structure, the SN ratio in the frame area FA can be increased, and the touch detection accuracy in the frame area FA can be improved in the present embodiment.

Further, the touch drive signal is supplied to the drive electrodes Tx (third electrodes), and contact or proximity of an object with the display area DA is detected based on electrostatic capacitance between the drive electrodes Tx and the touch detection electrodes Rx in the present embodiment. According to this structure, contact and proximity of an object with the display area DA and the frame area FA can be detected in the present embodiment.

Still further, in the present embodiment, since the level shifter is provided on the first substrate 111 (that is, in the display panel 11), the cost can be reduced as compared to the structures of the first and second comparative examples of the present embodiment, for example.

Still further, design flexibility may be reduced if an external level shifter (IC), etc., is provided as in the first and second comparative examples of the present embodiment. However, if a level shifter is provided in the display panel 11, design flexibility in a slew rate, etc., can be increased.

Still further, in the present embodiment, contact or proximity of an object can be detected by an appropriate touch detection operation (the mutual capacitance detection method and the self capacitance detection method) by switching between the touch detection operation (first detection operation) of detecting contact or proximity of an object based on the mutual electromagnetic capacitance between the drive electrodes TxL and TxR and the touch detection electrodes Rx and the touch detection operation (second detection operation) of detecting contact or proximity of an object based on the self electromagnetic capacitance of the drive electrodes TxL, TxR and Tx.

Figure 14:
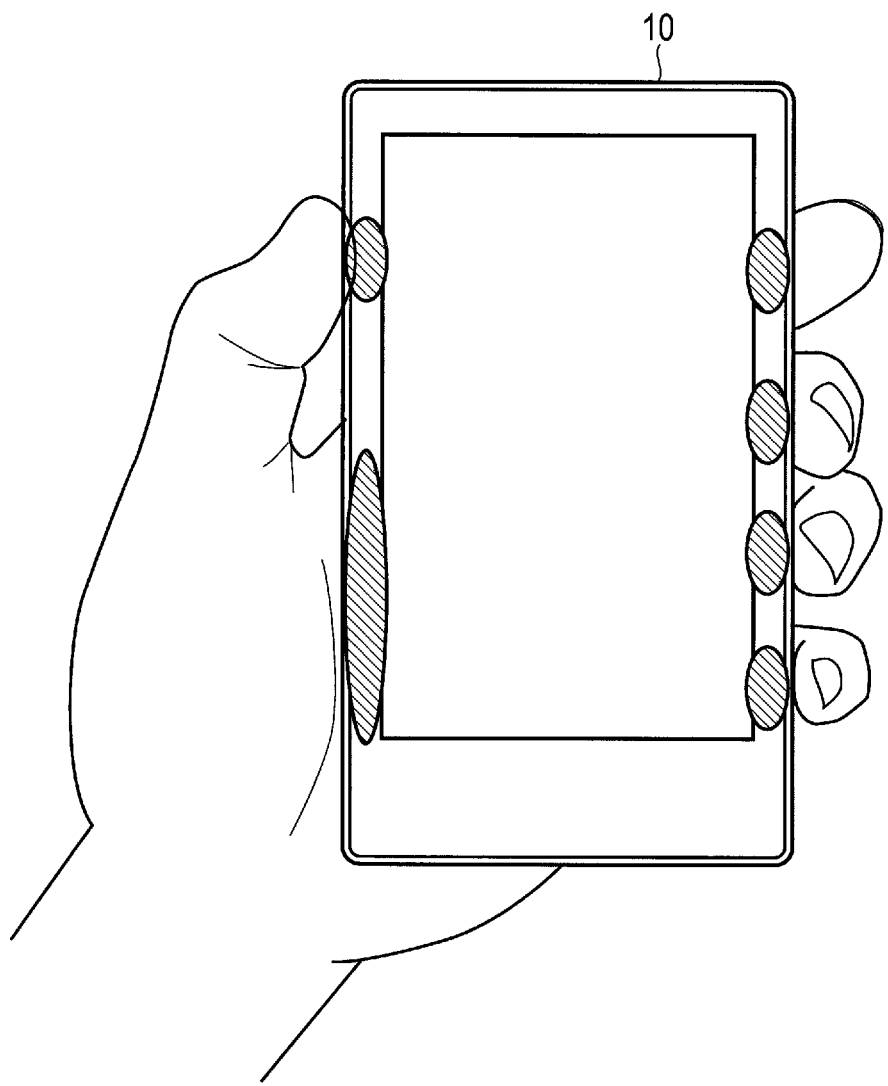
FIG. 14 is a diagram showing the state of a smartphone being held with one hand.

Still further, in the present embodiment, the touch detection electrodes Rx extend in a direction (first direction) along the short sides (first sides) of the display area DA and are arranged in a direction (second direction) along the long sides (second sides adjacent to the first sides) of the display area DA. Still further, the drive electrodes Tx extend in a direction along the long sides of the display area DA and are arranged in a direction along the short sides of the display area DA. Still further, the drive electrodes TxL and TxR extend in a direction along the long sides of the display area DA and arranged in such a manner as to face each other across the display area DA in the cover base 14. According to this structure, contact or proximity of an object with the frame area FA on both sides of the display area DA of the display device 10 such as the smartphone shown in FIG. 5, for example, can be detected in the present embodiment. Accordingly, the state of the smartphone being held with one hand, for example, can be detected based on the contact portions of fingers, etc., in the frame area FA as shown in FIG. 14. Further, in the state of holding the smartphone with the left hand, for example, the user can perform various operations (for example, a shutter operation of a camera, a scrolling operation of a screen, a volume control operation, etc.) by touching or swiping the frame area FA on the left side of the display area DA with the thumb, etc. Note that these operations may be enabled if the state of the smartphone being held with one hand is detected.

Still further, the level shifters provided for the drive electrodes TxL and TxR are arranged close to each other in the present embodiment. More specifically, the level shifters provided for the drive electrodes TxL and TxR are not arranged separately from each other but may be arranged collectively on the left side or the right side, etc., of the common electrode driver CD (the shift register circuits, the inverters and the AND circuits provided for the drive electrodes Tx1 to Tx5 shown in FIG. 12), for example. According to this structure, the flexible printed circuit board connected to the cover base 14 (the drive electrodes TxL and TxR) can be efficiently arranged.

Still further, the touch detection electrode RxB, which extends in a direction along the short sides of the display area DA, is arranged in the cover base 14 along the long sides of the display area DA in the present embodiment. According to this structure, a function such as an input button can be realized, for example, in a location below the display area DA of the display device 10 such as the smartphone shown in FIG. 5, etc., without designing and incorporating a separate component, etc.

Although the touch detection electrode RxB is only arranged in a location below the display area DA in the present embodiment, the same touch detection electrode as the touch detection electrode RxB may also be arranged in a location above the display area DA, for example.

Further, the common electrodes COME for displaying an image in the display area DA are used as the drive electrodes Tx for detecting contact or proximity of an object, and the display operation of displaying an image in the display area DA and the touch detection operation are executed in a time sharing manner, and therefore the thickness of the display device 10 can be reduced and the image quality of the display device 10 can be improved in the present embodiment.

Although the display device 10 is assumed to have the in-cell touch detection mechanism 12 in the present embodiment, the present embodiment may also be realized as a display device having an on-cell touch detection mechanism, for example.

Further, although the display device 10 is generally described as a smartphone in the present embodiment, the display device according to the present embodiment may be applied to an electronic device having an area corresponding to the frame area, such as a mobile phone, a personal computer, a television receiver, a vehicle-mounted device, a game console or a wearable device.

Second Embodiment

Next, the second embodiment will be described. Since the main structure of a display device according to the present embodiment is the same as that of the first embodiment, the present embodiment will be described with reference to FIGS. 1 to 9, etc., when necessary. Further, in the following description, detailed description of the same portions as those of the first embodiment will be omitted, and portions different from those of the first embodiment will be mainly described.

The display device 10 according to the present embodiment differs from that of the first embodiment in the circuit structure of the display panel 11.

An example of the circuit structure (panel circuit) of the display panel 11 in the present embodiment will be described hereinafter with reference to FIG. 15. In FIG. 15, a structure for supplying a touch detection signal to each drive electrode in the execution of a touch detection operation (that is, during the touch detection period) will be mainly described.

Here, the drive electrodes Tx1 to Tx5 are provided as the drive electrodes Tx in the display panel 11 shown in FIG. 15. Further, the drive electrodes TxL and TxR shown in FIG. 15 are arranged (formed) in the cover base 14. In the execution of the touch detection operation, the touch drive signal is supplied to these drive electrodes. Further, the panel driver 133 is provided on the first substrate 111 and includes the level shifter 113*a*.

The display panel 11 includes a shift register circuit, an inverter, an AND circuit, a level shifter, etc. The shift register circuit, the inverter and the AND circuit are provided for each of the drive electrodes Tx1 to Tx5. Since the shift register circuit, the inverter and the AND circuit provided for each of the drive electrodes Tx1 to Tx5 are the same as the shift register circuit 511, the inverter 512, the inverter 513 and the AND circuit 514, etc., shown in FIG. 12, detailed description thereof will be omitted.

In the meantime, a level shifter and an inverter are provided for each of the drive electrodes TxL and TxR in the display panel 11 in the present embodiment.

A level shifter 601 and an inverter 602 provided for the drive electrode TxL will be described below.

In the present embodiment, the touch detection driver 121 outputs the touch drive signal PadL as the touch drive signal for the mutual capacitance detection method and the touch drive signal for the self capacitance detection method with respect to the drive electrode TxL.

The level shifter 601 is arranged between the drive electrode TxL and the touch detection driver 121. The touch drive signal PadL output from the touch detection driver 121 is input to the level shifter 601 via a switch 603. The level shifter 601 increases the signal level of the input touch drive signal PadL, and outputs the input touch drive signal PadL having the increased signal level to the drive electrode TxL. More specifically, if the signal level of the touch drive signal PadL output from the touch detection driver 121 is about 5 V, for example, the level shifter 601 outputs the touch drive signal PadL having an increased signal level of about 15 V, for example. The switch 603 is in the connected state if the output of the inverter 602 is "1", and the switch 603 is in the disconnected state if the output of the inverter 602 is "".

The detection method designation signal SELFEN is input to the inverter 602. The detection method designation signal SELFEN is "1" if the touch detection operation by the self capacitance detection method is executed, and the detection method designation signal SELFEN is "0" if the touch detection operation by the mutual capacitance detection method is executed. Accordingly, the inverter 602 outputs "0" if the detection method designation signal SELFEN is "1", and the inverter 602 outputs "1" if the detection method designation signal SELFEN is "0".

That is, in the present embodiment, if the detection method designation signal SELFEN is "0" (that is, the touch detection operation by the mutual capacitance detection method is executed), the switch 603 is in the connected state, and the touch drive signal PadL is input to the level shifter 601.

On the other hand, if the detection method designation signal SELFEN is "1" (that is, the touch detection operation by the self capacitance detection method is executed), the switch 603 is in the disconnected state, and the touch drive signal PadL is not input to the level shifter 601.

Further, as shown in FIG. 15, a switch 604 is provided between the drive electrode TxL and the touch detection driver 121. The switch 604 is in the connected state if the detection method designation signal SELFEN is "1", and the switch 604 is in the disconnected state if the detection method designation signal SELFEN is "0". The switch 604 (and the switch 603) functions as a switch which switches between the mutual capacitance detection method and the self capacitance detection method.

According to the switch 604, if the detection method designation signal SELFEN is "1", the touch drive signal PadL is supplied to the drive electrode TxL via the switch 604. On the other hand, if the detection method designation signal SELFEN is "0", the touch drive signal PadL is not supplied to the drive electrode TxL via the switch 604.

That is, in the present embodiment, if the touch detection operation by the mutual capacitance detection method is executed, the touch drive signal PadL having the increased signal level (15 V) is supplied to the drive electrode TxL. On the other hand, if the touch detection operation by the self capacitance detection method is executed, the touch drive signal PadL (5 V) output from the touch detection driver 121 is directly supplied to the drive electrode TxL.

Although the description here focuses on the drive electrode TxL, the same also applies to the drive electrode TxR, and thus detailed description thereof will be omitted.

Figure 16:
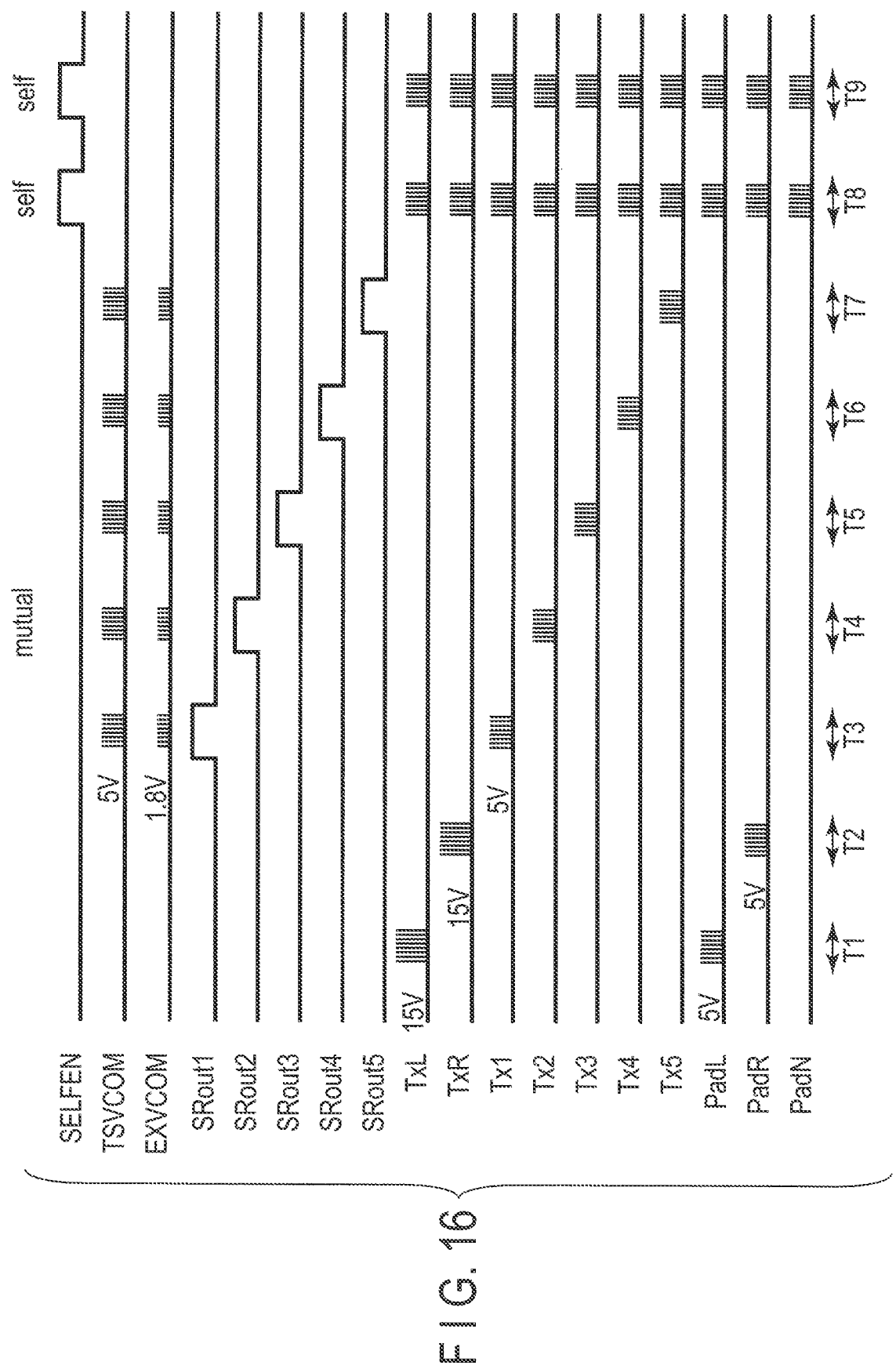
FIG. 16 is a timing chart showing a touch detection operation.

Next, the touch detection operation in the display device 10 according to the present embodiment will be described with reference to the timing chart shown in FIG. 16.

Here, after the touch detection operation by the mutual capacitance detection method is executed, the touch detection operation by the self capacitance detection method is executed (that is, the mutual capacitance detection method is switched to the self capacitance detection method). In FIG. 16, touch detection periods T1 to T7 correspond to a period in which the touch detection operation by the mutual capacitance detection method is executed, and touch detection periods T8 and T9 correspond to a period in which the touch detection operation by the self capacitance detection method is executed.

In the execution of the touch detection operation by the mutual capacitance detection method, the touch drive signal for the mutual capacitance detection method is sequentially supplied to the drive electrodes TxL, TxR and Tx1 to Tx5.

Firstly, the touch detection period T1 in which the touch drive signal is supplied to the drive electrode TxL will be described.

In the touch detection period T1, the touch detection driver 121 outputs (supplies) the touch drive signal PadL having a signal level of 5 V, for example.

Here, since the touch detection operation by the mutual capacitance detection method is executed in the touch detection period T1, the detection method designation signal SELFEN is "0". In this case, the switch 603 is in the connected state, and the switch 604 is in the disconnected state.

Accordingly, after the touch drive signal PadL is output from the touch detection driver 121, the signal level of the touch drive signal PadL is increased by the level shifter 601, and the touch drive signal PadL having the increased signal level is supplied to the drive electrode TxL. The signal level of the touch drive signal PadL supplied to the drive electrode TxL is 15 V, for example.

Accordingly, the touch detection driver 121 can detect contact of an object with the frame area FA in which the drive electrode TxL is arranged, based on mutual electrostatic capacitance between the drive electrode TxL and the touch detection electrodes Rx.

In the meantime, the touch detection driver 121 does not output the touch drive signal PadR, which is to be supplied to the drive electrode TxR, in the touch detection period T1. Therefore, the touch drive signal is not supplied to the drive electrode TxR in the touch detection period T1.

Similarly, the touch detection driver 121 does not output the touch drive signal (drive signal EXVCOM), which is supplied to the drive electrodes Tx1 to Tx5, in the touch detection period T1. Therefore, the touch drive signal is not supplied to the drive electrodes Tx1 to Tx5 in the touch detection period T1.

As described above, the circuit structure (that is, the shift register circuit, the inverter, the AND circuit, etc.) which supplies the touch drive signal to the drive electrodes Tx1 to Tx5 is the same as that of the first embodiment. That is, the direct-current voltage VCOMDC is supplied to the drive electrodes Tx1 to Tx5 in the touch detection period T1.

Further, in the execution of the touch detection operation by the mutual capacitance detection method, the touch drive signal PadN for the self capacitance detection method with respect to the drive electrodes Tx1 to Tx5 will not be output from the touch detection driver 121. In FIG. 16, the touch drive signal PadN represents the touch drive signals Pad1 to Pad5 for the self capacitance detection method which are supplied to the drive electrodes Tx1 to Tx5.

Although the description here focuses on the touch detection period T1, the touch drive signal PadR is output from the touch detection driver 121 in the touch detection period T2, in place of the touch drive signal PadL in the touch detection period T1. Accordingly, the touch drive signal PadR (15 V) is supplied to the drive electrode TxR. In the touch detection period T2, the touch drive signal is not supplied to the drive electrode TxL, and the direct-current voltage VCOMDC is supplied to the drive electrodes Tx1 to Tx5.

Further, in the touch detection period T3, the shift register circuit provided for the drive electrode Tx1 is selected, and the drive pulse TSVCOM (5 V) is supplied to the drive electrode Tx1.

In the touch detection period T3 in which the touch drive signal is supplied to the drive electrode Tx1, the touch detection driver 121 does not output the touch drive signals PadL and PadR. Therefore, the touch drive signal is not supplied to the drive electrodes TxL and TxR in the touch detection period T3. Further, the direct-current voltage VCOMDC is supplied to the drive electrodes Tx2 to Tx5.

Similarly, the drive pulse TSVCOM (5 V) is supplied to the drive electrode Tx2 in the touch detection period T4. Further, the drive pulse TSVCOM (5 V) is supplied to the drive electrode Tx3 in the touch detection period T5. Still further, the drive pulse TSVCOM (5 V) is supplied to the drive electrode Tx4 in the touch detection period T6. Still further, the drive pulse TSVCOM (5 V) is supplied to the drive electrode Tx5 in the touch detection operation T7.

In the execution of the touch detection operation by the mutual capacitance detection method, the touch drive signal is sequentially supplied to the drive electrodes TxL, TxR and Tx1 to Tx5 as described above.

In the present embodiment, as compared to the drive signal EXVCOM output from the touch detection driver 121 to the drive electrodes Tx1 to Tx5, the signal level of the touch drive signals PadL and PadR output from the touch detection driver 121 to the drive electrodes TxL and TxR is not increased by the pulse driver 113 (level shifter 113*a*). Therefore, to sufficiently increase the signal level of the touch drive signals PadL and PadR supplied to the drive electrodes TxL and TxR, the signal level of the touch drive signals PadL and PadR output from the touch detection driver 121 is set higher than the signal level of the drive signal EXVCOM. As a result, the signal level of the touch drive signal (first drive signal) supplied to the drive electrodes TxL and TxR is higher than the signal level of the touch drive signal (second drive signal) supplied to the drive electrodes Tx1 to Tx5.

Here, it is assumed that the mutual capacitance detection method is switched to the self capacitance detection method. In the execution of the touch detection operation by the self capacitance detection method, the touch drive signal for the self capacitance detection method is supplied to the drive electrodes TxL, TxR and Tx1 to Tx5. In the present embodiment, the touch drive signal for the self capacitance detection method supplied to the drive electrodes TxL and TxR corresponds to the touch drive signals PadL and PadR. Further, the touch drive signal for the self capacitance detection method supplied to the drive electrodes Tx1 to Tx5 corresponds to the touch drive signal PadN (touch drive signals Pad1 to Pad5).

In the touch detection period T8 in which the touch detection operation by the self capacitance detection method is executed, the touch detection driver 121 outputs the touch drive signals PadL, PadR and PadN as the touch drive signal for the self capacitance detection method.

In the execution of the touch detection operation by the self capacitance detection method, the detection method designation signal SELFEN is "1". In this case, for example, since the switch 604 provided for the drive electrode TxL is in the connected state, the touch drive signal PadL output from the touch detection driver 121 is supplied to the drive electrode TxL. The same also applies to the drive electrode TxR.

Further, if the detection method designation signal SELFEN is "1" as described above, the switch provided for the drive electrode Tx1 which switches between the mutual capacitance detection method and the self capacitance detection method is in the connected state, for example. In this case, the touch drive signal Pad1 output from the touch detection driver 121 is supplied to the drive electrode Tx1. The same also applies to the drive electrodes Tx2 to Tx5.

Accordingly, the touch detection driver 121 can detect contact of an object based on the self electrostatic capacitance of the drive electrodes TxL, TxR and Tx1 to Tx5.

In the execution of the touch detection operation by the self capacitance detection method, the touch drive signals PadL, PadR and PadN for the self capacitance detection method are supplied to the drive electrodes TxL, TxR and Tx1 to Tx5 as described above.

Although the description here focuses on the touch detection period T8, the same operation as that of the touch detection period T8 will be executed, for example, in the execution of the touch detection operation by the self capacitance detection method in the touch detection period T9.

As described above, the touch detection driver 121 supplies the touch drive signals PadL and PadR (first drive signal) to the drive electrodes TxL and TxR, and the drive signal EXVCOM (second drive signal) is supplied to the drive electrodes Tx1 to Tx5. The touch drive signals PadL and PadR are increased in signal level by the level shifters (for example, the level shifter 601) provided for the drive electrodes TxL and TxR and then supplied to the drive electrodes TxL and TxR. On the other hand, the drive signal EXVCOM is increased in signal level by the level shifter 113*a* in the panel driver 113 and supplied to the drive electrodes Tx1 to Tx5. The signal level of the touch drive signals PadL and PadR is higher than the signal level of the drive signal EXVCOM.

According to this structure, since the touch drive signal having a signal level higher than that of the touch drive signal supplied to the drive electrodes Tx1 to Tx5 can be supplied to the drive electrodes TxL and TxR, the SN ratio in the frame area FA can be increased, and the touch detection accuracy in the frame area FA can be improved in the present embodiment.

Further, as compared to the circuit structure of the display panel 11 in the first embodiment, the AND circuits are not required for the drive electrodes TxL and TxR, for example, and therefore the circuit structure can be simplified in the present embodiment.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device which displays an image in a display area based on a pixel signal, the display device comprising:
   a plurality of first electrodes overlapping the display area;
      a cover base covering the display area and a frame area outside the display area;
   a second electrode arranged in the cover base and overlapping the frame area;
   a touch detection driver configured to output a drive signal to the second electrode;
   a level shifter arranged between the second electrode and the touch detection driver, and configured to increase a signal level of the drive signal and output the drive signal having the increased signal level to the second electrode; and
   a plurality of third electrodes arranged in a location opposed to the first electrodes, wherein
   the touch detection driver is configured to:
      detect contact or proximity of an object with the frame area based on electrostatic capacitance between the first electrodes and the second electrode; and
      output a drive signal to the third electrodes, and detect contact or proximity of an object with the display area based on electrostatic capacitance between the first electrodes and the third electrodes,
   a first detection operation of detecting contact or proximity of the object based on mutual electrostatic capacitance between the first electrodes, and the second electrode and the third electrodes, and
   a second detection operation of detecting contact or proximity of the object based on self-electromagnetic capacitance of each of the second electrode for objection detection on the frame area and the third electrodes for objection detection on the display area, wherein the first detection operation and the second detection operation are switched by a switch.

2. The display device of claim 1, further comprising:
a first substrate; and
a second substrate opposed to the first substrate, wherein
the level shifter and the third electrodes are arranged on the first substrate,
the first electrodes are arranged on the second substrate, and
the cover base is opposed to the second substrate.

3. The display device of claim 1, wherein
the display area has a rectangular shape,
the first electrodes are configured to extend in a first direction along first sides of the display area and are arranged in a second direction along second sides adjacent to the first sides,
the third electrodes are configured to extend in the second direction and are arranged in the first direction, and
the second electrode is configured to extend in the second direction, and the second electrodes are arranged in the cover base and face each other across the display area.

4. The display device of claim 3, wherein the level shifter is provided for each of the second electrodes.

5. The display device of claim 4, wherein the level shifters provided respectively for the second electrodes are arranged close to each other.

6. The display device of claim 4, wherein the drive signal is sequentially supplied to the second electrodes and the third electrodes.

7. The display device of claim 1, further comprising a fourth electrode arranged in the cover base and overlapping the frame area, wherein
the touch detection driver is configured to detect contact or proximity of the object with the frame area based on electrostatic capacitance between the third electrodes and the fourth electrode.

8. The display device of claim 7, wherein
the display area has a rectangular shape,
the first electrodes are configured to extend in a first direction along first sides of the display area and are arranged in a second direction along second sides adjacent to the first sides,
the third electrodes are configured to extend in the second direction and are arranged in the first direction, and
the fourth electrode is configured to extend in the first direction and arranged along the first side.

9. A display device which displays an image in a display area based on a pixel signal, the display device comprising:
a plurality of first electrodes overlapping the display area;
a cover base covering the display area and a frame area outside the display area;
a second electrode arranged in the cover base and overlapping the frame area;
a touch detection driver configured to output a drive signal to the second electrode;
a level shifter arranged between the second electrode and the touch detection driver, and configured to increase a signal level of the drive signal and output the drive signal having the increased signal level to the second electrode;
a plurality of third electrodes arranged in a location opposed to the first electrodes; and
a panel driver configured to drive a display panel including the third electrodes, wherein
the touch detection driver is configured to:
detect contact or proximity of an object with the frame area based on electrostatic capacitance between the first electrodes and the second electrode; and
output a drive signal to the third electrodes, and detect contact or proximity of an object with the display area based on electrostatic capacitance between the first electrodes and the third electrodes,
the panel driver is configured to increase a signal level of the drive signal output from the touch detection driver and output the drive signal having the increased signal level to the third electrodes, and
the level shifter is configured to increase a signal level of the drive signal having the increased signal level even more and output the drive signal having the even more increased signal level to the second electrode.

10. The display device of claim 9, wherein a plurality of common electrodes for displaying an image in the display area are used as the third electrodes.

11. The display device of claim 10, wherein a display operation of displaying an image in the display area and a detection operation of detecting contact or proximity of the object are executed in a time sharing manner.

12. A display device which displays an image in a display area based on a pixel signal, the display device comprising:
a plurality of first electrodes overlapping the display area;
a cover base covering the display area and a frame area outside the display area;
a second electrode arranged in the cover base and overlapping the frame area;
a touch detection driver configured to output a drive signal to the second electrode;
a level shifter arranged between the second electrode and the touch detection driver, and configured to increase a signal level of the drive signal and output the drive signal having the increased signal level to the second electrode;
a plurality of third electrodes arranged in a location opposed to the first electrodes; and
a panel driver configured to drive a display panel including the third electrodes, wherein
the touch detection driver is configured to:
detect contact or proximity of an object with the frame area based on electrostatic capacitance between the first electrodes and the second electrode;
output a drive signal to the third electrodes, and detect contact or proximity of an object with the display area based on electrostatic capacitance between the first electrodes and the third electrodes; and
output a first drive signal to the second electrode and output a second drive signal different from the first drive signal to the third electrodes,
the level shifter is configured to increase a signal level of the first drive signal and output the first drive signal having the increased signal level to the second electrode,
the panel driver is configured to increase a signal level of the second drive signal and output the second drive signal having the increased signal level to the third electrodes, and
the signal level of the first signal supplied to the second electrode is higher than the signal level of the second drive signal supplied to the third electrodes.

13. The display device of claim 12, wherein a plurality of common electrodes for displaying an image in the display area are used as the third electrodes.

14. The display device of claim 13, wherein a display operation of displaying an image in the display area and a detection operation of detecting contact or proximity of the object are executed in a time sharing manner.

* * * * *